(12) United States Patent
Matsui

(10) Patent No.: US 6,418,140 B1
(45) Date of Patent: Jul. 9, 2002

(54) DATA MULTIPLEXING METHOD, DATA MULTIPLEXER USING THE MULTIPLEXING METHOD, MULTIPLE DATA REPEATER, MULTIPLE DATA DECODING METHOD, MULTIPLE DATA DECODING DEVICE USING THE DECODING METHOD, AND RECORDING MEDIUM ON WHICH THE METHODS ARE RECORDED

(75) Inventor: Yoshinori Matsui, Katano (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/202,143

(22) PCT Filed: Jun. 25, 1997

(86) PCT No.: PCT/JP97/02197
§ 371 (c)(1),
(2), (4) Date: Dec. 9, 1998

(87) PCT Pub. No.: WO98/01970
PCT Pub. Date: Jan. 15, 1998

(30) Foreign Application Priority Data

Jul. 3, 1996 (JP) ............................................. 8-173262

(51) Int. Cl.$^7$ ............................................. H04L 12/50
(52) U.S. Cl. .................................... 370/378; 348/423.1
(58) Field of Search ................................ 370/274, 315, 370/378, 381, 428, 371, 374, 429, 493, 535, 537; 348/423.1

(56) References Cited

U.S. PATENT DOCUMENTS 5,898,695 A * 4/1999 Fujii et al. .................. 370/464
5,899,578 A * 5/1999 Yanagihara et al. .......... 386/75

FOREIGN PATENT DOCUMENTS

| JP | 62-82737 | 4/1987 |
| JP | 2-276329 | 11/1990 |
| JP | 6216873 | 8/1994 |
| JP | 8-56204 | 2/1996 |
| JP | 8-98160 | 4/1996 |
| JP | 8-125690 | 5/1996 |

OTHER PUBLICATIONS

ISO/IEC 13818–1:1996(E) "Information Technology—Generic Coding of Moving Pictures and Associated Audio Information: Systems" Apr. 15, 1996.

* cited by examiner

Primary Examiner—Wellington Chin
Assistant Examiner—Brenda Pham
(74) Attorney, Agent, or Firm—Parkhurst & Wendel, L.L.P.

(57) ABSTRACT

A decoding buffer capacity necessary for decoding N pieces of digital data, including a picture, audio, a character and another form of data, is found beforehand. Then the found capacity is compared with a predetermined value. M pieces of digital data are selected out of the N pieces of digital data so that a total buffer capacity necessary for decoding the M pieces of digital data is not more than the predetermined value. Then the M pieces of digital data are multiplexed and supplied as one multiplexed data. This data multiplexing method enables systems having different buffer capacities in their own decoders to exactly decode digital data by changing decoding buffer capacities that are predetermined. As a result, a transmission free from missing an important data is realized.

20 Claims, 17 Drawing Sheets

DATA MULTIPLEXING METHOD, DATA MULTIPLEXER USING THE MULTIPLEXING METHOD, MULTIPLE DATA REPEATER, MULTIPLE DATA DECODING METHOD, MULTIPLE DATA DECODING DEVICE USING THE DECODING METHOD, AND RECORDING MEDIUM ON WHICH THE METHODS ARE RECORDED

TECHNICAL FIELD

The present invention relates to a method of data multiplexing utilized in multiplexing digital data including pictures, audio and characters, and transmitting or recording the resultant multiplex data, a method of decoding the multiplexed data, a decoder using the decoding method, a multiplexed data repeater disposed between a multiplexer and the decoder, and a recording medium in which the methods are recorded.

PRIOR ART

An international standard called "MPEG 2" is a method of multiplexing digital data such as pictures, audio and characters. (Reference Documents: ISO/IEC JTC1/SC29/WG11 N801, "ISO/IEC 13818-1 International Standard: Information Technology—Generic Coding of Moving Pictures and Associated Audio Information: Systems", 1994. 11)

FIG. 13 is a block diagram of a multiplexing system that multiplexes pictures and audio data coded in the MPEG 2 format. The multiplexing system surrounded by a broken line comprises a picture data buffer 1305, a audio data buffer 1306, a packetizer 1307, a padding packet buffer 1309, a multiplexer 1311, and a timing generator 1314. A picture encoder 1301 and an audio encoder 1303 are coupled to this multiplexing system.

FIG. 14 is a flowchart depicting an operation of a selector 1311. FIG. 15 is a schematic diagram illustrating a data structure of MPEG 2. FIG. 16 illustrates a method of multiplexing data in MPEG 2 format. A conventional multiplexing method in MPEG 2 format is described hereinafter with reference to FIGS. 13, 14, 15 and 16.

FIG. 15 is a schematic diagram illustrating a data structure of MPEG 2. A picture or an audio data shown in FIG. 15(a) is cut out in a given size, then a header is attached to the taken-out picture or audio data as shown in FIG. 15(b) before being packetized into a PES packet. As shown in FIG. 15(c), the header includes an identifier for identifying a kind of data, a decoding time at which a frame of picture or an audio data should be decoded as well as a reproduction time at which the frame of the picture or the audio data should be reproduced. One picture frame comprises one picture, and an audio frame comprises e.g. 1152 audio samples. Further, as shown in FIG. 15(d) and FIG. 15(e), another header called a pack header is included in the packet. The pack header includes a sample value of a reference time that is used for reproducing the reference time that is produced in the decoder.

An operation of the multiplexing system shown in FIG. 13 is described hereinafter. The picture encoder 1301 encodes (compression) one picture frame and outputs a picture data 1302. An audio encoder 1303 encodes one frame of audio data and outputs an audio data 1304. The picture data and the audio data supplied to the multiplexing system are stored in the respective buffers 1305 and 1306. The timing generator 1314 generates a timing with which a packet should be supplied, and inputs the packet generating signal into the multiplexer 1311. The multiplexer operates following the flowchart shown in FIG. 14. When the packet generating signal 1315 is supplied in step 1401, a packet is selected for outputting process. In this process, it is assumed that a decoder is employed in the later process, and the packet is selected so that the buffer in the assumed decoder for pictures or audio data could avoid being overflowed or underflowed. A buffer capacity for pictures or audio data is standardized by MPEG 2, e.g. 1.8 M bit for pictures, 4096 bytes for audio data.

First, in step 1402, when a vacant capacity for one packet is found in the audio data buffer of the assumed decoder, an audio-packet-generating-signal 1313 is supplied to the packetizer 1307 in step 1403. The packetizer receives audio data for one packet from the buffer 1305, and outputs an audio packet 1308. When a vacant capacity for one packet is not found in the audio data buffer, while it is found in the picture data buffer of the assumed decoder in step 1404, a picture packet generating signal 1313 is supplied to the packetizer in step 1405. The packetizer receives a packet data for one packet from the buffer 1306 and outputs a picture packet 1308. In step 1407, when the multiplexer receives an audio packet or a picture packet, a reference time is attached to the received packet. When neither the audio data buffer nor picture data buffer has a vacant capacity for one packet, a padding packet 1310 is supplied to the multiplexer from a padding packet buffer 1309 in step 1406. In step 1408, the multiplexer outputs a received packet 1312.

FIG. 16 illustrates transitional occupied capacities of the picture data and audio data buffers, which are used in the multiplexer 1311 shown in the flowchart of FIG. 14. FIG. 16(b) depicts the transitional occupied capacity of audio data buffer. The X-axis indicates time "t" that is a reference time reproduced from the reference time sample value shown in FIG. 15. A data for one audio frame is decoded at the time of "ta1", "ta2", . . . respectively, and they are deleted from the buffer. The time, "ta1", "ta2", . . . , are the decoding time included in the packet header shown in FIG. 15(c). The Y-axis indicates a packet capacity occupied by data, and a broken line indicates a buffer size "Sa". FIG. 16(c) depicts the transitional occupied capacity of picture data buffer. A data for one picture frame is decoded at the time of "tv1", "tv2", . . . respectively, and they are deleted from the buffer. The Y-axis indicates a packet capacity occupied by data, and a broken line indicates a buffer size "Sv". FIG. 16(a) depicts a packet stream 1312 that is tapped off from the selector 1311. Until the time "ta1", a vacant capacity for one packet is not available in the audio data buffer, while it is available in the picture data buffer. A picture packet is thus multiplexed. Because an audio frame is decoded at "ta1", an audio packet is multiplexed. At just before "tv4", because neither of the audio packet nor picture packet has a vacant capacity for one packet, a padding packet is multiplexed.

FIG. 17 illustrates a conventional decoder for multiplexed data coded in MPEG 2 format. The decoder comprises the following elements: separator 1702, picture data buffer 1704, audio data buffer 1706, reference time reproduction part 1708, picture data decoder 1710, audio data decoder 1712.

The separator 1702 receives and separates a multiplexed data 1701 into a picture packet data 1703 and an audio packet data 1705 referring to the identifier attached to the packet header. The resultant separated data 1701 and 1703 are stored in the respective buffers 1704 and 1706. At the same time, a sample value 1707 of the reference time is extracted and supplied to the reference time reproduction part 1708, where a reference clock of the decoder is produced. The reproduction part 1708 outputs a reference time signal 1709 to the picture data decoder 1710 as well as to the audio data decoder 1712. The picture data decoder 1710 compares the decoding time included in the picture-packet-header that is stored in the buffer 1704 with the reference time signal. When the decoding time comes, the picture data is decoded and a picture frame 1711 is reproduced. In the same manner, the audio decoder 1712 compares the decoding time included in the-audio-packet-header that is stored in the buffer 1706 with the reference time signal. When the decoding time comes, the audio data is decoded and an audio frame 1713 is reproduced.

A method of object coding has drawn attention as a new coding method. This method divides a picture into objects such as a plurality of pictures physically including background and foreground pictures as well as audio accompanying the respective pictures. The conventional coding method of picture and audio has handled a picture and audio data thereof hitherto as a whole picture and audio accompanying the picture. An advantage of this object coding method is to lower a transmission rate by the following methods: (a) replace an original background with another background, (b) delete or add an object arbitrary, (c) select a particular object to transmit.

The multiplexing method that handles a picture in a frame unit coded in MPEG 2 format as described in the prior art has encountered various problems. For instance, in a case where respective object data are multiplexed and supplied to a multiplexed data decoder, it is difficult to manage the data buffers, because the respective object data are to be stored in the data buffers after the multiplexed data are separated and picture data as well as audio data are decoded.

It is necessary to assign the data buffer to the respective object data in the decoder; however, no management method is available. A total buffer capacity required by the respective objects sometimes exceeds the data buffer capacity of the decoder. When it happens, all or some of the objects cannot be correctly decoded. An object including an important message can be thus missed.

Further there are a few problems. On a transmission line between the multiplexer and the decoder, no method is ready to select some objects when all the objects cannot be multiplexed. When the transmission line between the multiplexer and the decoder is changed at a relay point in between, all the objects arrived there cannot transmitted further. The decoder cannot thus produce a correct decoded result.

DISCLOSURE OF THE INVENTION

A data multiplexing method of the first invention addressing the problems mentioned above is described hereinafter. This multiplexing method comprises the following steps:

(a) receiving and multiplexing N pieces of digital data such as pictures, audio or characters (N=natural number);

(b) preparing a buffer capacity necessary for decoding N pieces of digital data;

(c) comparing the prepared buffer capacity with a given capacity;

(d) selecting M pieces of digital data out of N pieces of digital data so that a total decoded buffer capacity thereof can be not more than the given capacity (M=natural number, and $1 \leq M \leq N$).

(e) multiplexing the M pieces of digital data; and (f) outputting the multiplexed digital data as one multiplexed data.

This method can effect the following advantage. When coded data is transmitted between systems of which decoders have different decoding buffer capacities, decoding buffer capacities of the receiver sides should be informed before coded data are transmitted. Then a given capacity set in the transmitter side is replaced with this informed capacity responsive to the receiver. The object data thus can be decoded correctly and free from missing an important object.

A data multiplexing method of the second invention is described hereinafter. This multiplexing method comprises the following steps.

(a) receiving and multiplexing N pieces of object data such as pictures, audio or characters (N=natural number);

(b) supplying a transmission rate necessary for outputting each one of the respective N pieces object data;

(c) finding a total of the transmission rates necessary for each object data, and referring it as a first transmission rate (d) supplying a transmission rate of the transmission line where an output from the multiplexer is transmitted, and referring it as a second transmission rate;

(e) selecting M pieces of object data out of N pieces so that the first transmission rate (totaled transmission rates of respective M pieces objects) can be not more than the second transmission rate (transmission rate of the transmission line); and (f) multiplexing the selected M pieces objects data.

A data multiplexing method of the third invention comprises the following steps.

(a) receiving N pieces of object data including pictures, audio or characters, and multiplexing them;

(b) producing a table data where at least one of the following data are described:
  (b-1) a number of digital data to be multiplexed;
  (b-2) decoding buffer capacities of each digital data;
  (b-3) coding rates of each digital data;
  (b-4) priority order of each digital data; and
  (b-5) identifiers of each digital data, which identify the data as a picture, audio, characters or another data.

(c) multiplexing the table data to the multiplexed data so that decoding buffer of the decoder can be assigned to each object with ease.

A decoding multiplexed data of the fourth invention is described hereinafter. The decoding method comprises the following steps.

(a) receiving N pieces of object data including pictures, audio or characters in a multiplexed form with a predetermined unit such as an object unit (N=natural number);

(b) checking a decoding buffer capacity, and referring it as a first decoding buffer capacity;

(c) obtaining respective decoding buffer capacities necessary for decoding N pieces of digital data;

(d) finding a total decoding buffer capacity of the N pieces digital data, and referring it as a second decoding buffer capacity;

(e) checking whether the first decoding buffer capacity exceeds the second one; and (f) when the first capacity exceeds the second one, selecting M pieces of digital data from the multiplexed data and outputting them ($1 \leq M \leq N$).

Through these steps, the data that the transmitter desires to send can be exactly decoded and reproduced. The same process as mentioned above can be applicable to the transmission rate with the same effect.

A multiplexed data repeater of the fifth invention solves the problem, i.e. a transmission rate is changed between the multiplexer and the decoder, by the following methods.

(a) receiving N pieces of digital data including pictures, audio or characters in a multiplexed form (N=natural number);

(b) selecting part of the data out of the multiplexed data; and (c) outputting the selected data changing the transmission rate, thereby transmitting the data exactly even if a transmission rate between the multiplexer and the decoder is changed.

A multiplexed data decoder of the sixth invention performs the following functions:

(a) receiving N pieces of object data including pictures, audio or characters in a multiplexed form (N=natural number);

(b) assigning the decoding buffer of the decoder to respective objects;

(c) dividing the decoding buffer into N pieces of sub-decoding buffers; and (d) storing the separated each object data in the respective sub-decoding buffers.

A recording medium of the seventh invention contains the methods of data multiplexing and a method of multiplexed data decoding mentioned above. When this medium is incorporated into a computer system, the data multiplexing system, multiplexed data repeater and multiplexed data decoder of the present invention can be effected with ease.

As such, the data multiplexing method, multiplexed data decoding method, and the devices employing these methods can effect an exact decoding of object data and a transmission free from missing an important message even between the systems having different decoding buffer capacities in their decoders. This advantage is executed in the following manner. Before transmitting coded data, the decoding buffer capacity on receiver sides should be informed. A given buffer capacity can be changed responsive to the capacity of the receiver. On the receiver side, on the other hand, if the decoding buffer capacity is insufficient for decoding the multiplexed data just received, the priority order of data units, e.g. an object unit, on the transmitter side should be obtained. Then data units are selected according to the priority order before they are decoded so that an important message can be exactly decoded.

Changing a given decoding buffer capacity in the system allows a user to transmit coded object data free from concerning the data capacity, and the data are decoded without missing an important message.

BRIEF DESCRIPTION OF THE DRAWINGS

FIG. 8(a) illustrates a packet stream in a data multiplexed form, FIG. 8(b) shows a packet, FIG. 8(c) shows a packet header, FIG. 8(d) shows an ID packet, FIG. 8(e) shows details of a table data, and FIG. 8(f) shows table data details of respective objects.

FIG. 15(a) shows MPEG 2 data comprising picture data, audio data and the like. FIG. 15(b) shows a picture data packet. FIG. 15(c) shows details of a header. FIG. 15(d) shows an audio data. FIG. 15(e) shows a pack header.

FIG. 16(a) shows a packet stream comprising a picture data, an audio data and the like, FIG. 16(b) shows a transitional occupied capacity of an assumed audio data buffer, FIG. 16(c) shows a transitional occupied capacity of an assumed picture data buffer.

FIG. 18 shows an example of a recording medium.

DETAILED DESCRIPTION OF PREFERRED EMBODIMENTS (Exemplary Embodiment 1)

The first exemplary embodiment is described hereinafter with reference to accompanying FIGS. 1–5.

Figure 1:
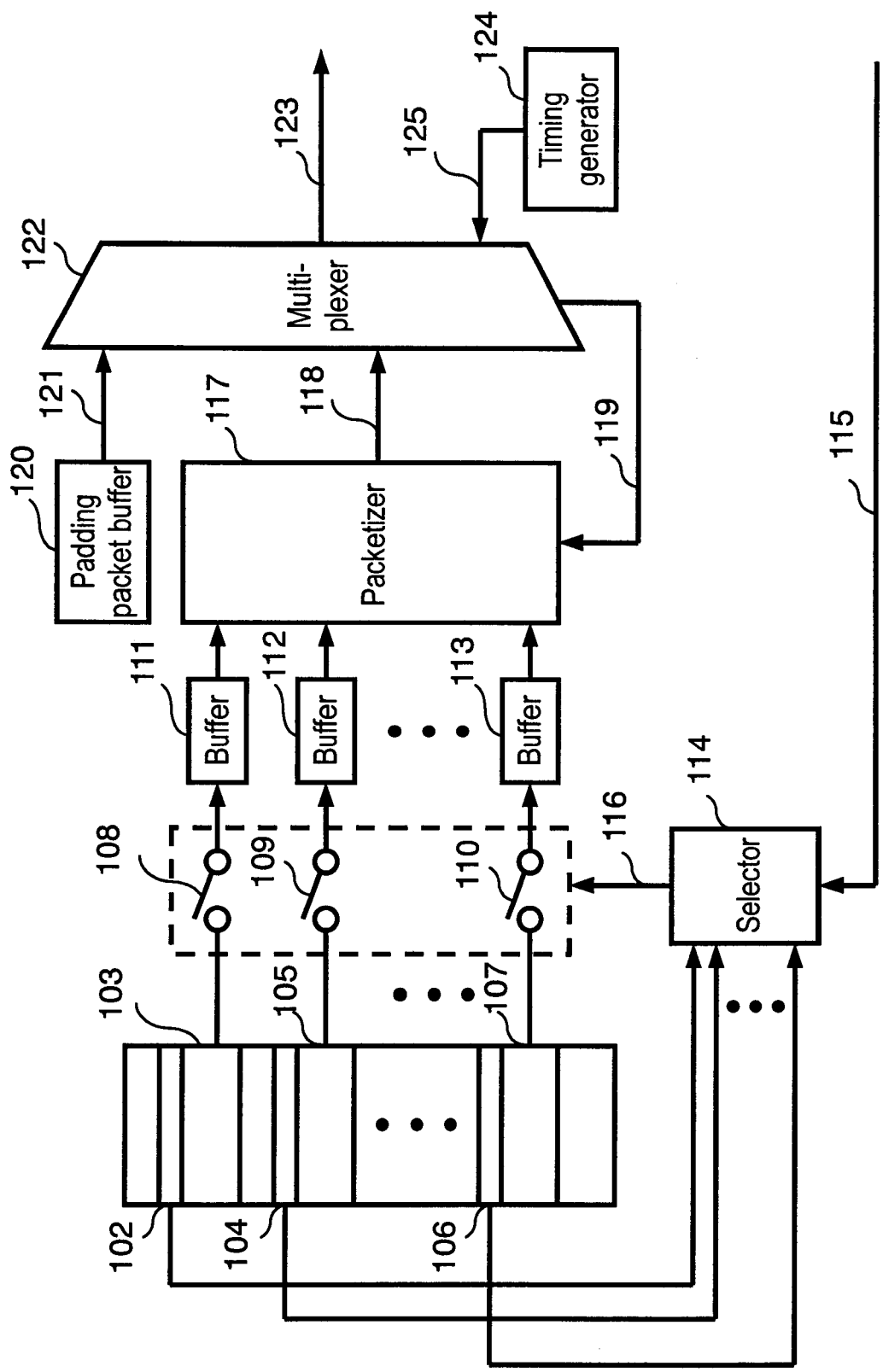
FIG. 1 is a block diagram depicting a data multiplexing system used in a first exemplary embodiment of the present invention.
Figure 2:
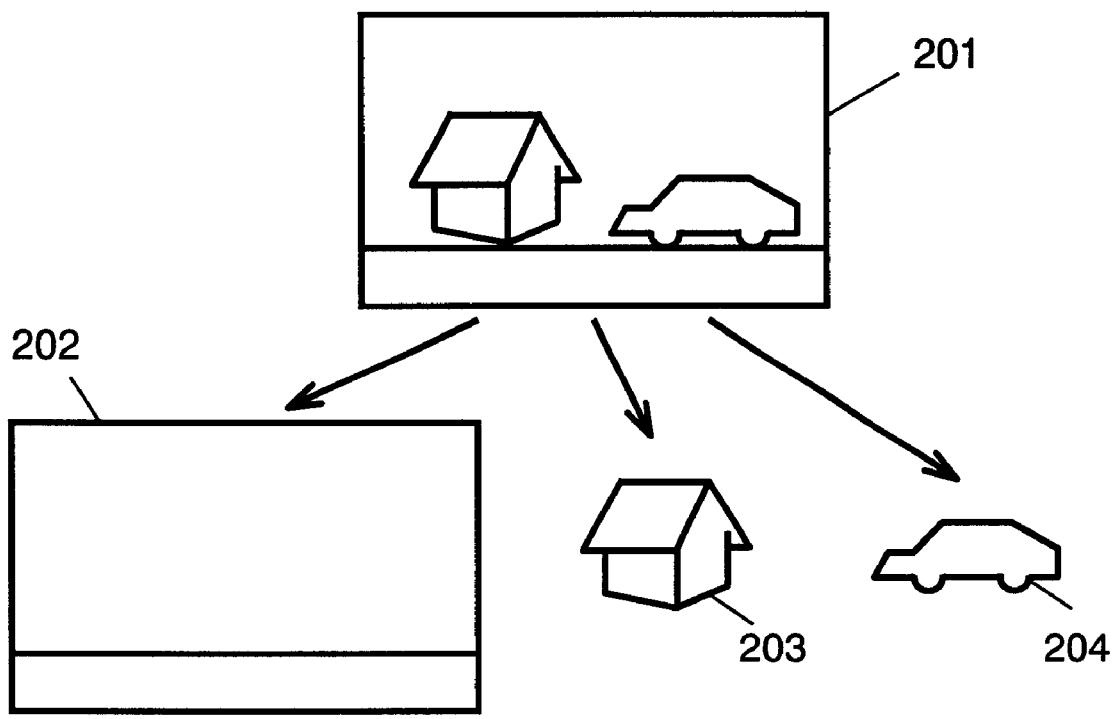
FIG. 2 illustrates a data multiplexing method used in the first exemplary embodiment of the present invention.
Figure 3:
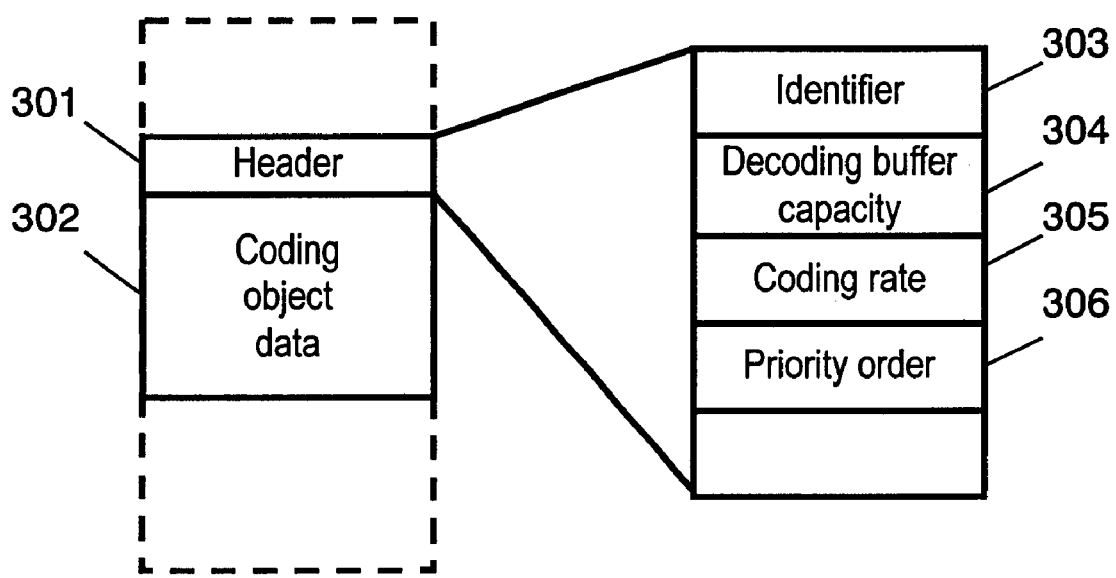
FIG. 3 illustrates details of data recorded by a recorder 101 used in the first exemplary embodiment of the present invention.
Figure 4:
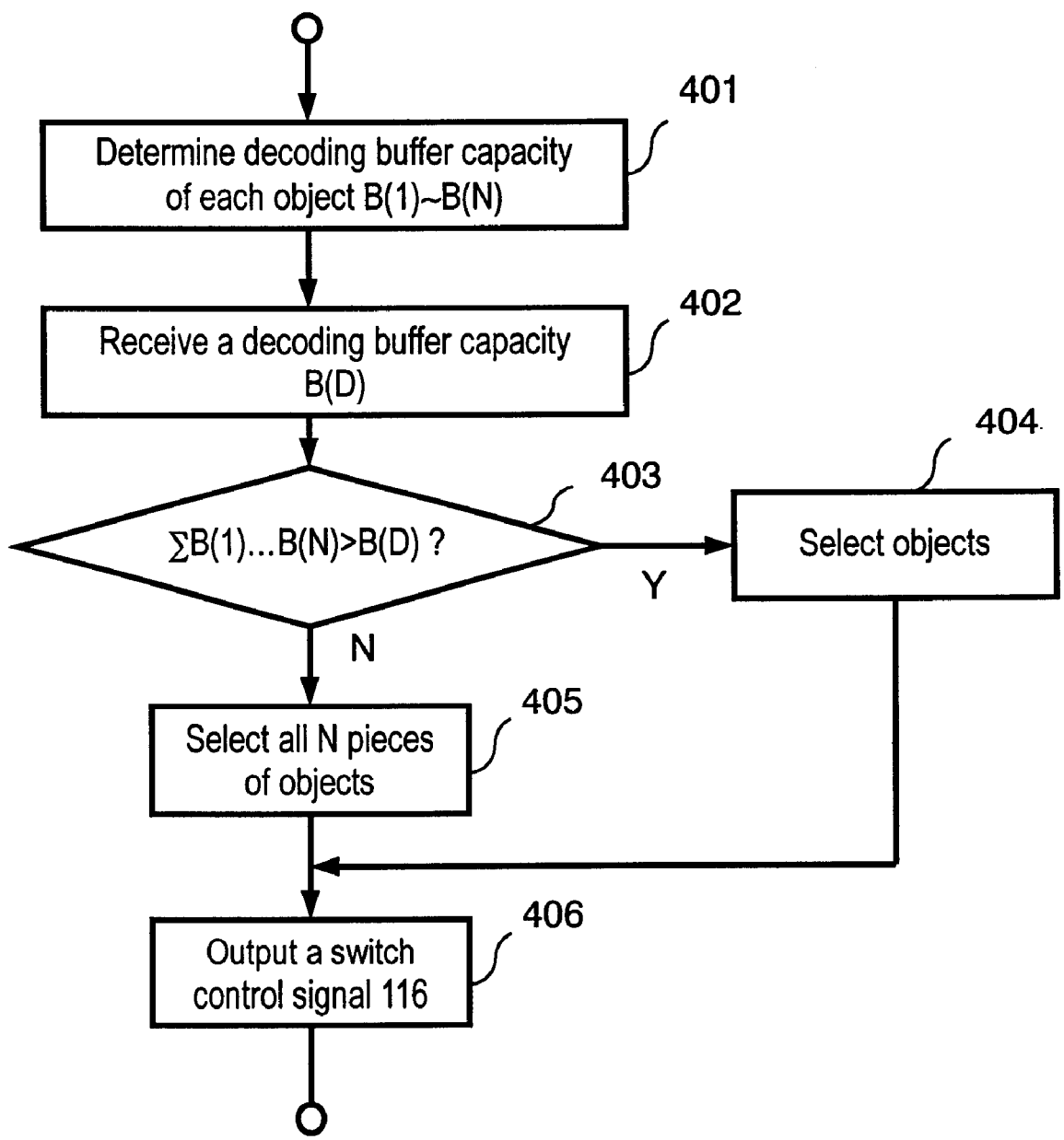
FIG. 4 is a flowchart depicting an operation of a selector 114 in the first exemplary embodiment of the present invention.
Figure 5:
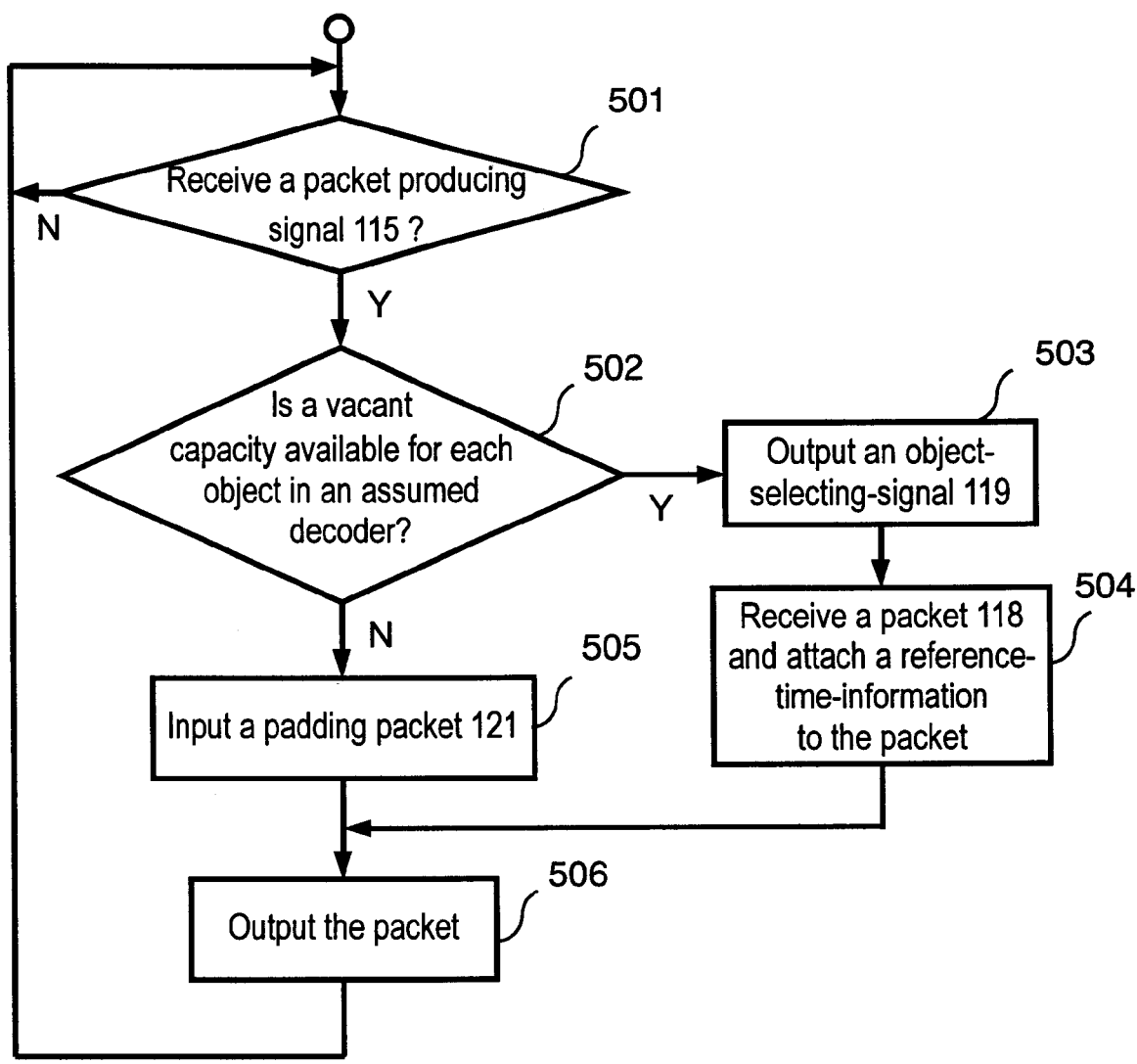
FIG. 5 is a flowchart depicting an operation of a multiplexer 122 in the first exemplary embodiment of the present invention.

FIG. 1 is a block diagram depicting a data multiplexing system used in a first exemplary embodiment of the present invention. The data multiplexing system comprises the following elements: recorder 101, switch 108, 109 and 110, buffer 111, 112 and 113, selector 114, packetizer 117, padding packet buffer 120, multiplexer 122, and timing generator 124. FIG. 2 illustrates a method of data multiplexing. FIG. 3 illustrates details of data recorded by a recorder 101. FIG. 4 is a flowchart depicting an operation of a selector 114. FIG. 5 is a flowchart depicting an operation of a multiplexer 122.

In a method of object coding, one picture frame is divided into units of object, and each object is coded, which is shown in FIG. 2. A picture 201 consists of three objects, i.e. a background object 202, a house object 203 and a car object 204. Each object is coded and recorded in the recorder 101 in the format shown in FIG. 3.

FIG. 3 shows a recording format in which a coded object is recorded in the recorder. The format comprises a coding object data 302 and a header 301. The header includes an identifier 303, a decoding buffer capacity 304, a coding rate 305 and a priority order 306 and others. The identifier 303 identifies what kind of data the object data is, i.e. picture, audio, character or another data. The decoding buffer capacity is a capacity necessary for decoding the object data. The coding rate is a bit-rate necessary for transmitting the object data. The priority order indicates a priority when the object data is transmitted. Headers 102, 104 and 106 of each object recorded in the recorder are supplied to the selector 114.

The selector operates following the flowchart shown in FIG. 4 as follows.

(1) step 401: Receive each decoding buffer capacity specified in respective headers of each object (total quantity of the objects is N, where N is a natural number.) The received capacities are referred to as B(1)–B(N).

(2) step 402: Receive a decoding buffer capacity 115 of the decoder and refer it as B(D).

(3) step 403: Find a total of B(1)–B(N) and compare it with B(D). When the total is not more than B(D), select all N pieces of objects. When the total is more than B(D), in step 404 select objects following the priority order recorded in each header of the respective objects so that a total decoding buffer capacity of the selected objects is not more than B(D).

(4) step 406: Output a switch control signal 116 corresponding to the selected objects. Each of the switches 108, 109 and 110 is turned on responsive to an instruction of the control signal 116, and each of object data 103, 105 and 107 is fed into the respective buffers 111, 112 and 113.

The timing generator 124 outputs a packet producing signal 125 to the multiplexer 122 at the time when a packet should be supplied. The multiplexer operates following the flowchart shown in FIG. 5 as follows.

(1) step 501: Receive the packet producing signal 125.

(2) step 502: In the following manner, select objects to be tapped off.

Assume that a decoder is assigned to each object data, then the objects are selected so that the total buffer capacity of the selected objects can avoid overflowing and underflowing an assumed decoding buffer capacity B(n) (1≦n≦N) of the assumed decoder.

(3) step 503: When a vacant capacity for one packet is available in any of the decoding buffers of the assumed decoder assigned to each object, an object-selecting-signal 119 is supplied to the packetizer 117. The packetizer receives the object-selecting-signal, then receives the corresponding object data in a capacity for one packet from the buffer, and packetizes it, then outputs the packet 118.

The packetizer also timely provides information about a time when an object data should be decoded in the decoder.

(4) step 504: Receive the packet 118 that is supplied from the packetizer, then reference-time-information is attached to the packet 118 at every appropriate interval. The reference-time-information is a reference-time-sample-value that is used for generating a reference time reproduced in the decoder.

(5) step 505: Select a padding packet 121 out of the padding packet buffer 120, when no vacant capacity for one packet is found in every assumed decoding buffer assigned to all the objects.

(6) step 506: The multiplexer outputs the selected packet and a packet stream 123 to which the object is multiplexed.

As such, according to the first exemplary embodiment of the present invention, the multiplexing system that multiplexes a plurality of object-data and outputs the multiplexed-data receives the buffer capacities B(1)–B(N) that is necessary for decoding N pieces of object data and the decoding buffer capacity B(D) of the receiver side. When a total of B(1)–B(N) exceeds B(D), object data are selected for being multiplexed according to the priority order specified in the headers recorded in the recorder so that the total decoding buffer capacity of the selected object data can be not more than B(D). As a result, the decoding buffer cannot overflow at the decoding. Therefore, the multiplexing system can advantageously outputs object data responsive to the capacity of each decoder that desirably receives the same data as other decoders receive.

In this exemplary embodiment, the decoding buffer capacities of each object are fed to the selector from the recorder; however, it is not limited to the recorder. For instance, a number indicating a decoding buffer capacity is multiplexed to each coded object data beforehand, and the selector can obtain each buffer capacity of the respective object data referring to a place of the object data where the number is multiplexed. The method can produce the same effect.

Further in this exemplary embodiment, the multiplexed objects are selected at the selector according to the priority order specified in the header recorded in the recorder; however it is not limited to this method. For instance, the target objects for selection are switched at every given time, or an object placed behind is selected first during a given time, then a foreground object is selected. These are also effective methods.

A unit of data selection is an object data in this exemplary embodiment; however, a block unit can be used and other predetermined unit also can be used with the same effect.

(Exemplary Embodiment 2)

Figure 6:
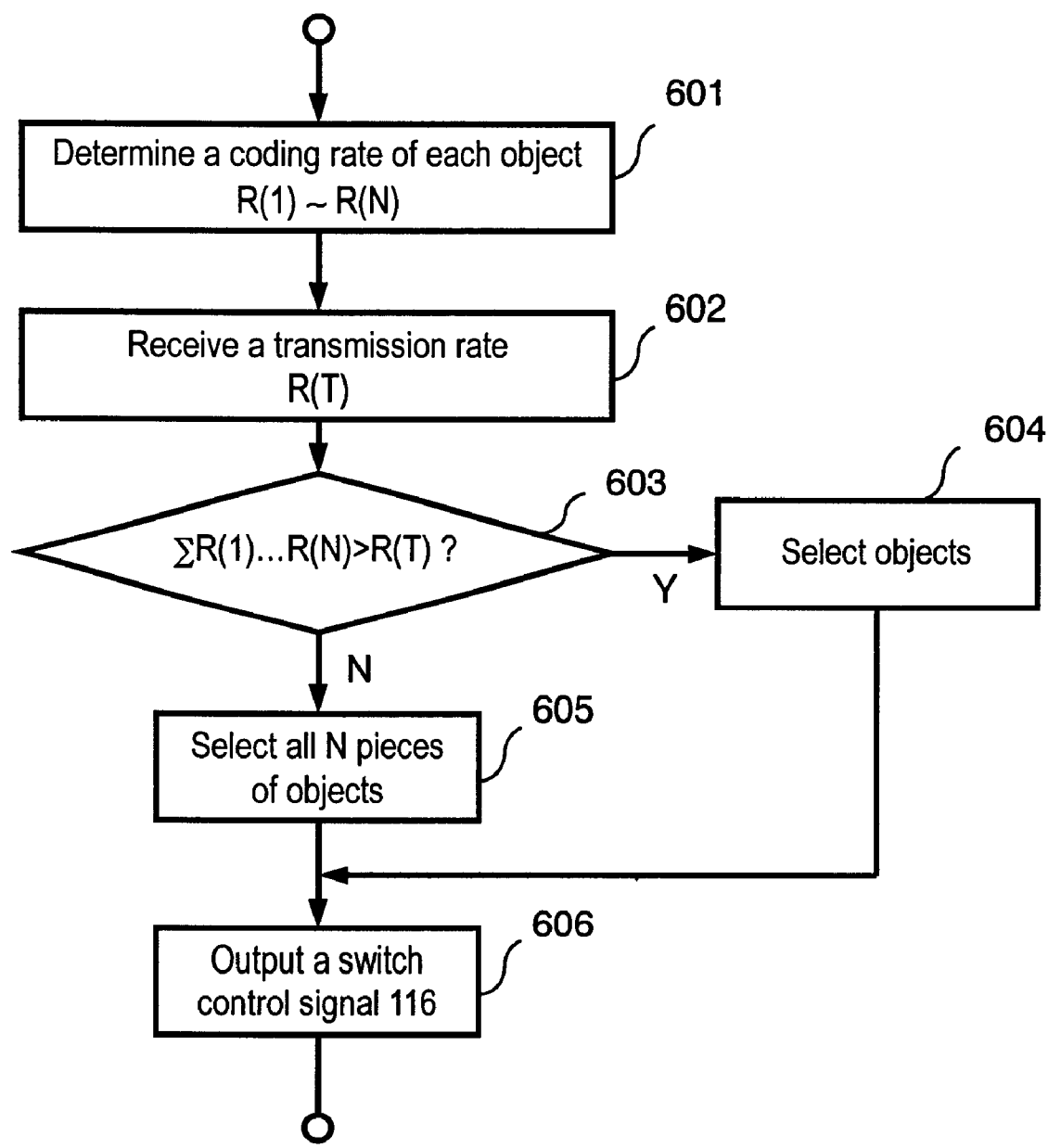
FIG. 6 is a flowchart depicting an operation of a selector 114 in a second exemplary embodiment of the present invention.
Figure 7:
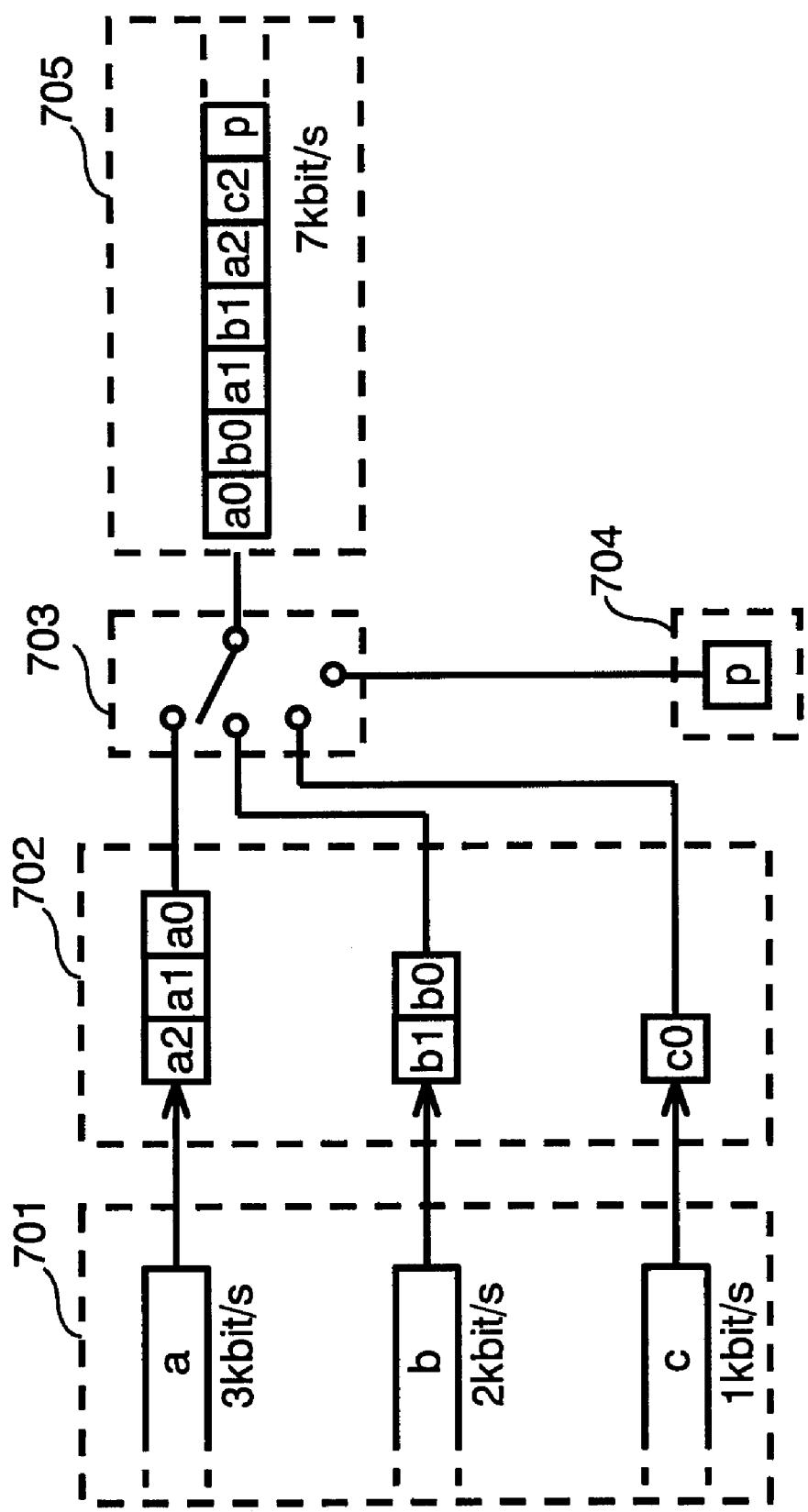
FIG. 7 illustrates an operation of a multiplexer 122 in the second exemplary embodiment of the present invention.

The second exemplary embodiment of the present invention is described with reference to FIGS. 1, 6 and 7. FIG. 6 is a flowchart depicting an operation of a selector 114 in the second exemplary embodiment. FIG. 7 illustrates an operation of the multiplexer 122.

In FIG. 1, the selector 114 receives the headers 102, 104 and 106 of each object recorded in the recorder 101 and the transmission rate 115. The selector operates following the flowchart shown in FIG. 6 as follows.

Step 601: Receive each coding rate specified in respective headers of each object (total quantity of the objects is N, where N is a natural number.) The supplied coding rates are referred to as R(1)–R(N).

Step 602: Receive the transmission rate 115 and refer it as R(T).

Step 603: Find a total of R(1)–R(N) and compare it with R(T). When the total is not more than R(T), select all N pieces objects.

Step 604: When the total is more than R(T), select objects following the priority order recorded in each header of the respective objects so that a total transmission rates of the selected objects are not more than R(T).

Step 606: Output a switch-control-signal 116 corresponding to the selected objects. Each of the switches 108, 109 and 110 is turned on responsive to an instruction of the control signal 116, and each of object data 103, 105 and 107 is fed into the respective buffers 111, 112 and 113.

The timing generator 124 outputs a packet-producing-signal 125 to the multiplexer 122 at the time when a packet should be supplied. The multiplexer selects the objects to be multiplexed according to the ratio of coding rate vs. transmission rate of each object. FIG. 7 illustrates the case where three object data, i.e. "a", "b" and "c" having a coding rate 3 k bit/sec, 2 k bit/sec and 1 k bit/sec respectively, are multiplexed and tapped off at 7 k bit/sec transmission rate. Each object data shown in 701 are packetized as shown in 702, i.e. the object data "a" is packetized into "a0", "a1" and "a2", the object data "b" into "b0" and "b1", and the object data "c" into "c0". When seven packets are multiplexed with a switch 703, the above packets are multiplexed, and a padding packet "p" shown in 704 adjusts the transmission rate to be 7 k bit/sec. The multiplexer 122 thus outputs the packet stream 123 on which the object data are multiplexed.

As such, according to the second exemplary embodiment, the multiplexing system that multiplexes a plurality of object data and outputs the multiplexed data receives the coding rates R(1)–R(N) that are necessary for decoding N pieces of object data and the transmission rate R(T). When a total of R(1)–R(N) exceeds R(T), object data are selected for being multiplexed according to the priority order specified in the headers recorded in the recorder so that the total coding rates of the selected object data can be not more than R(T). As a result, the object data can be exactly multiplexed and transmitted within the transmission rate. Therefore, the multiplexing system can advantageously outputs object data relevant to the transmission rate of the respective decoders that require the same data as other decoders require.

In this exemplary embodiment, the coding rates of each object are fed to the selector from the recorder; however, it is not limited to the recorder. For instance, a number indicating a coding rate is multiplexed to each coded object data beforehand, and the selector can obtain each coding rate of the respective object data referring to a place of the object data where the number is multiplexed. This method can also produce the same effect.

Further in this exemplary embodiment, the multiplexed objects are selected at the selector according to the priority order specified in the heads recorded in the recorder; however it is not limited to this method. For instance, the target objects of selection are switched at every given time, or an object placed behind is selected first during a given time, then a foreground object is selected, or an audio object is selected with priority over a picture object. These methods are also effective.

(Exemplary Embodiment 3)

Figure 8:
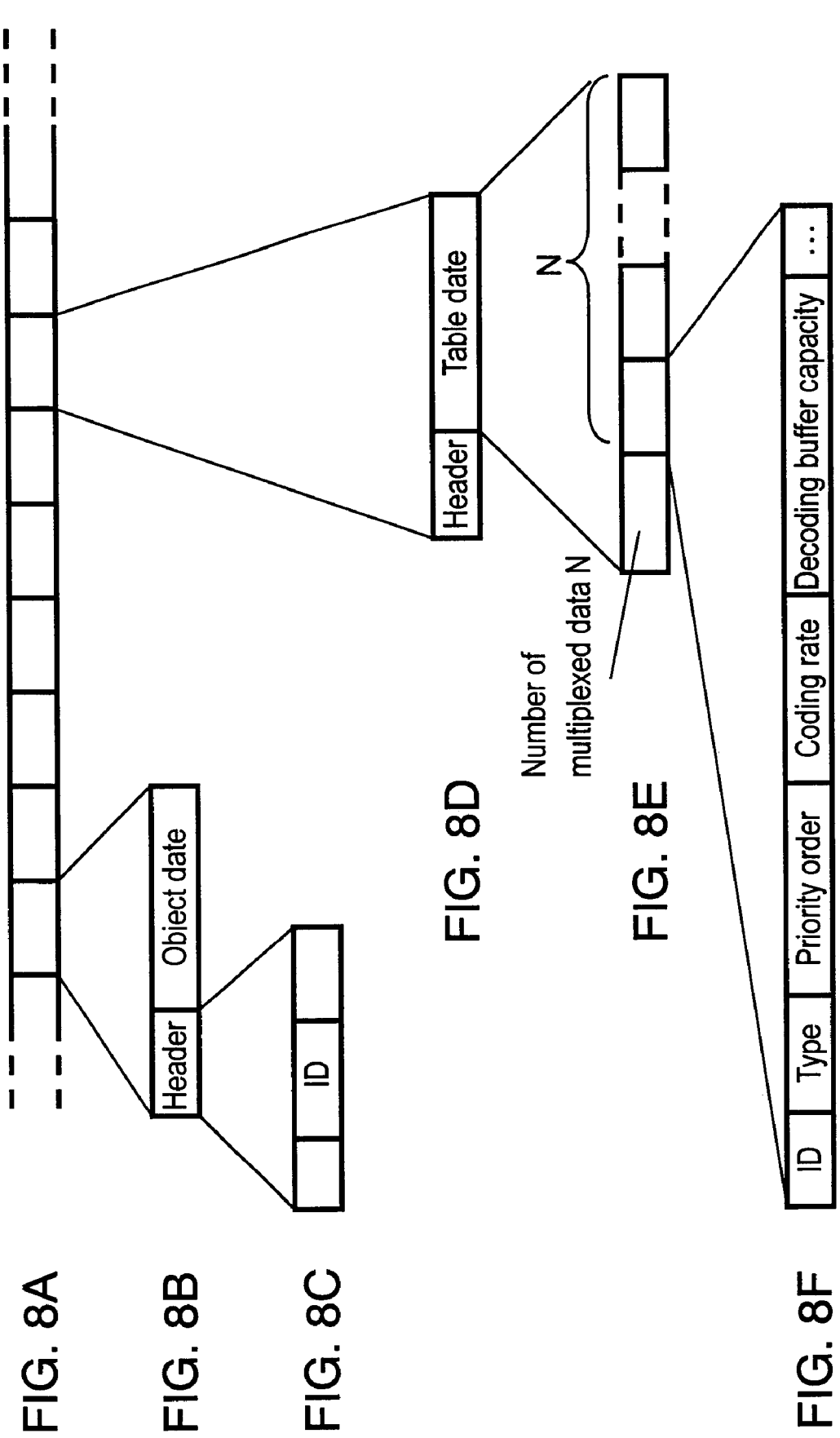
FIG. 8 illustrates a packet stream multiplexed by a data multiplexing method used in a third exemplary embodiment of the present invention.

The third exemplary embodiment is described with reference to FIG. 8 that illustrates a packet stream multiplexed by a data multiplexing method. The packet stream shown in FIG. 8(a) is divided into a header and data as shown in FIG. 8(b). As shown in FIG. 8(c), the header includes an ID that identifies a kind of object. As shown in FIG. 8(d), a packet having a specific ID includes a table data of which details are shown in FIG. 8(e). The table data includes a number of objects included in the multiplexed data, and the following data of the respective objects as shown in FIG. 8(f): (1) an ID as a header of a packet to identify each object, (2) a type recognizing a kind of object, (3) priority order of object, (4) a coding rate of object, (5) a decoding buffer capacity of object and the like.

This table data is multiplexed at least once during multiplexing data, preferably multiplexed at every given interval so that multiplexed status can be further changed with ease, or a number of multiplexed data and the priority order can be obtained in the decoder readily.

(Exemplary Embodiment 4)

Figure 9:
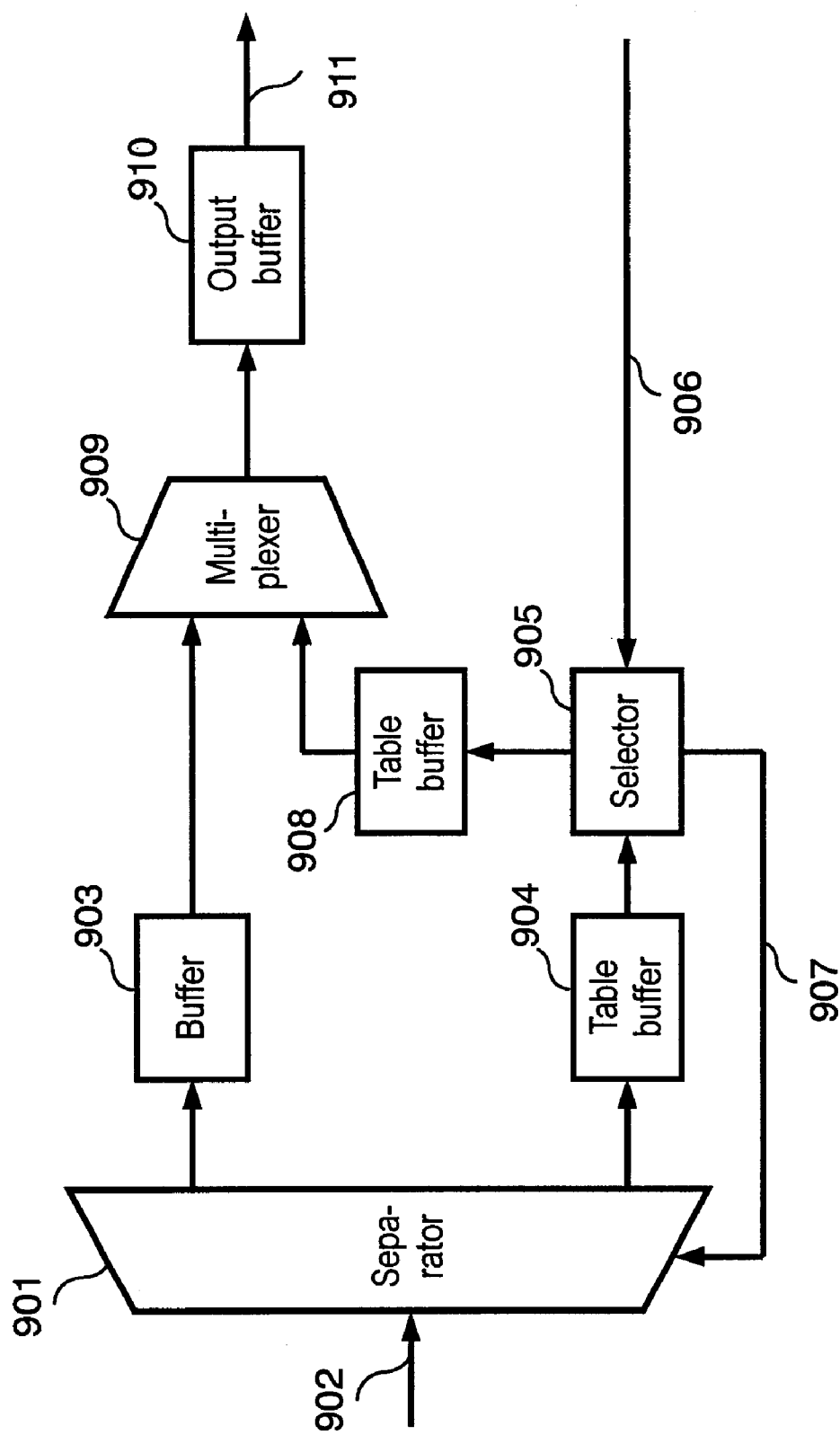
FIG. 9 is a block diagram depicting a data repeater used in a fourth exemplary embodiment of the present invention.
Figure 10:
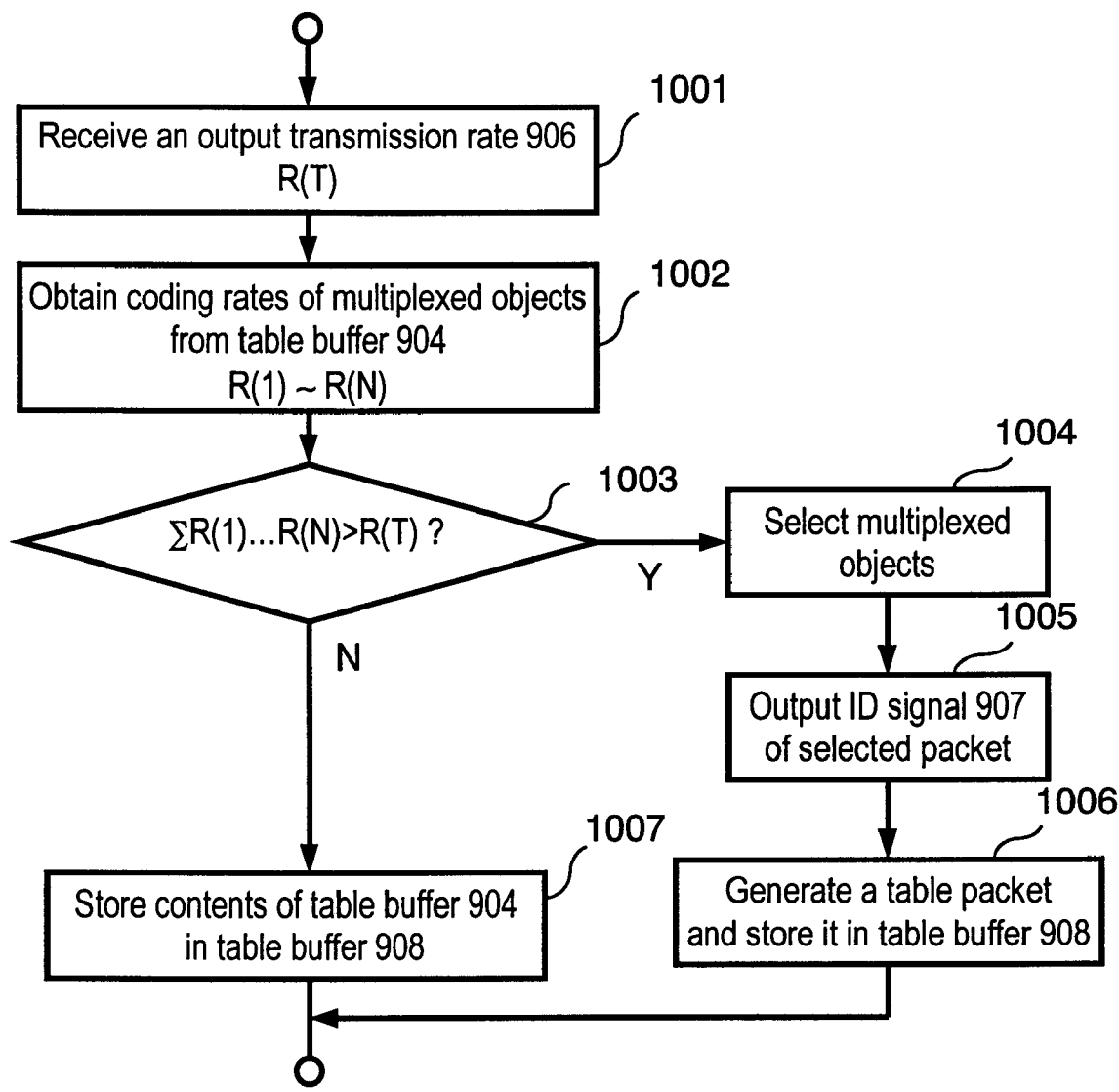
FIG. 10 is a flowchart depicting an operation of a selector 905 in the fourth exemplary embodiment of the present invention.

A data repeater used in the fourth exemplary embodiment of the present invention is described hereinafter with reference to FIGS. 9 and 10. FIG. 9 is a block diagram depicting the data repeater that comprises the following elements: separator 901, buffer 903, first table buffer 904, selector 905, second table buffer 908, multiplexer 909 and output buffer 910. FIG. 10 is a flowchart depicting an operation of the selector 905.

Multiplexed data 902 fed into the separator 901 is divided into a table packet and other packets. The table packet is stored in the first table buffer 904, where the packet includes the content described in the third exemplary embodiment. The selector 905 operates following the flowchart shown in FIG. 10 as follows.

Step 1001: Receive an output transmission rate 906 and refer to it as R(T).

Step 1002: Receive a table packet from the first table buffer 904 and analyze it thereby obtaining coding rates of N pieces of object data to be multiplexed to the multiplexed data (N: natural number) and the obtained rates are referred to as R(1)–R(N).

Step 1003: Find a total of R(1)–R(N) and compare the total with R(T). When the total is not more than R(T), in step 1007 store the table packet that is stored in the first table buffer 904 into the second table buffer 908.

Step 1004: When the total is more than R(T), select objects following the priority order specified in the table packet so that a total transmission rates of the selected objects are not more than R(T).

Step 1005: Output a signal 907 indicating an ID of the packet to be selected to the separator 901.

Step 1006: Update the table packet in the first table buffer 904, by deleting the information about non-selected packets from the table packet or by attaching a flag indicating "non-selected" to the table packet. The table packet thus produced is stored in the second table buffer 908.

The separator 901 outputs only the packets that have IDs specified by a selecting-packet-ID-signal 907 to the buffer 903, and abandons the other packets having IDs not specified. The multiplexer 909 multiplexes the packet supplied to the buffer 903 and the table packet supplied to the second table buffer 908, and outputs the resultant multiplexed packet to the output buffer 910. The output buffer outputs a multiplexed data 911 according to the output transmission rate.

As such, according to the fourth exemplary embodiment, the multiplexed-data-repeater repeating the multiplexed data where a plurality of object data are multiplexed can output the multiplexed data including only important objects and conforming with an output-transmission-rate. This is achieved by referring to the priority order recorded in the table packet, even if the transmission rate of input-multiplexed-data differs from that of output-multiplexed-data. Therefore, the multiplexing system that multiplexes a plurality of object data and outputs the multiplexed data can multiplex the data free from concerning the transmission rate up to the decoder. The decoder also can decode the multiplexed data free from missing an important object.

(Exemplary Embodiment 5)

Figure 11:
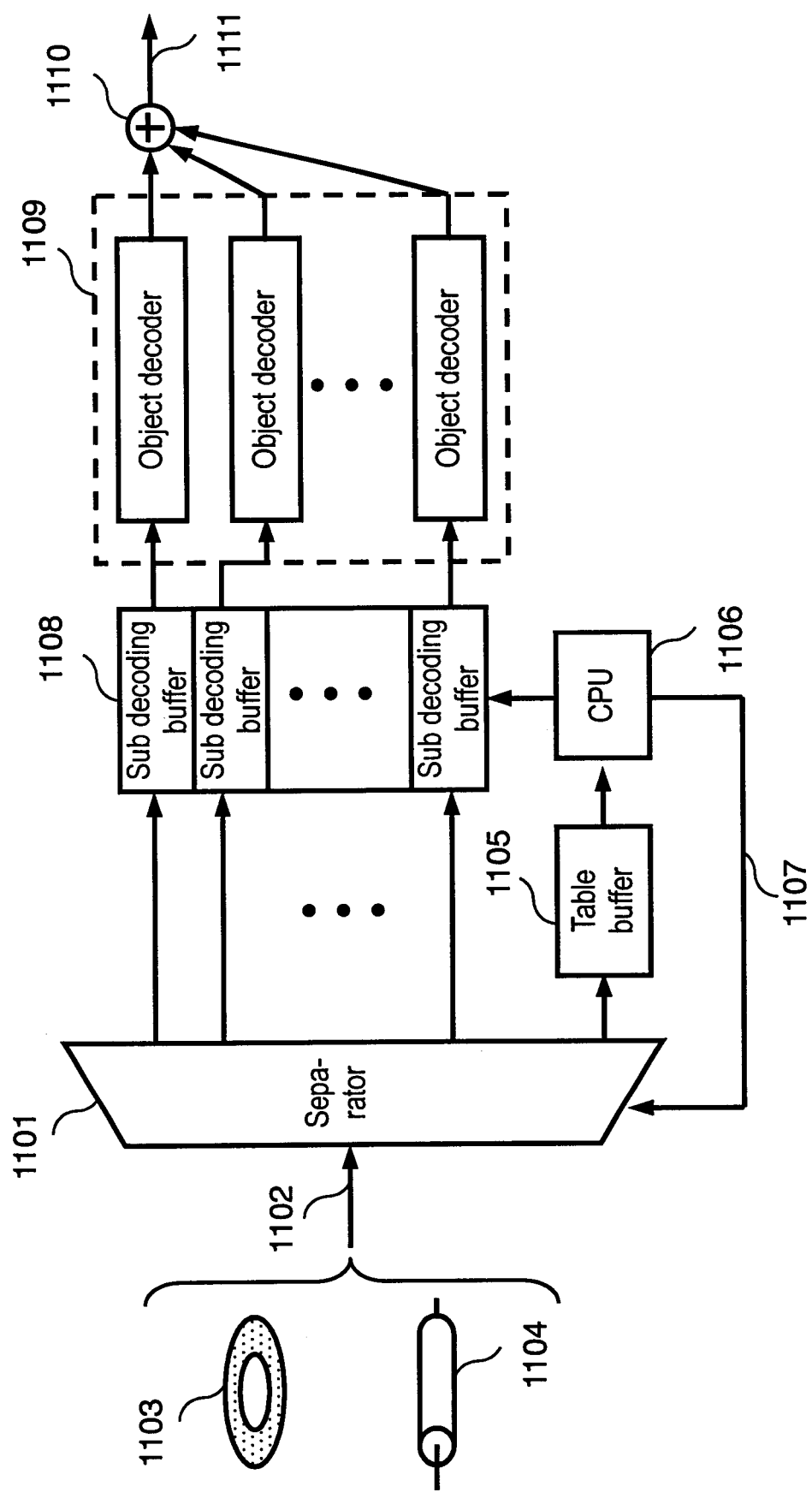
FIG. 11 illustrates a multiplexed data decoder used in a fifth exemplary embodiment of the present invention.
Figure 12:
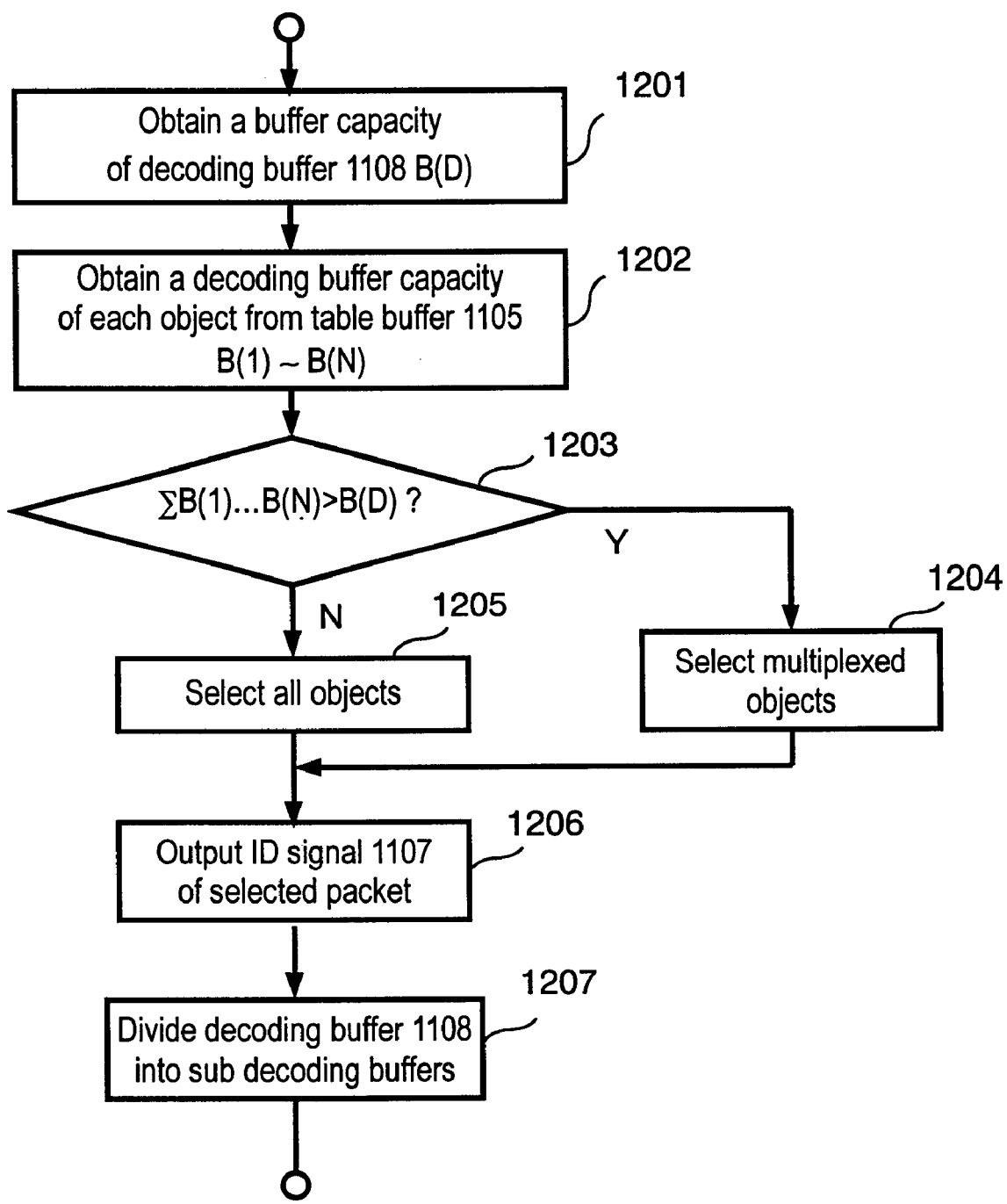
FIG. 12 is a flowchart depicting an operation of a CPU 1106 in the fifth exemplary embodiment of the present invention.
Figure 13:
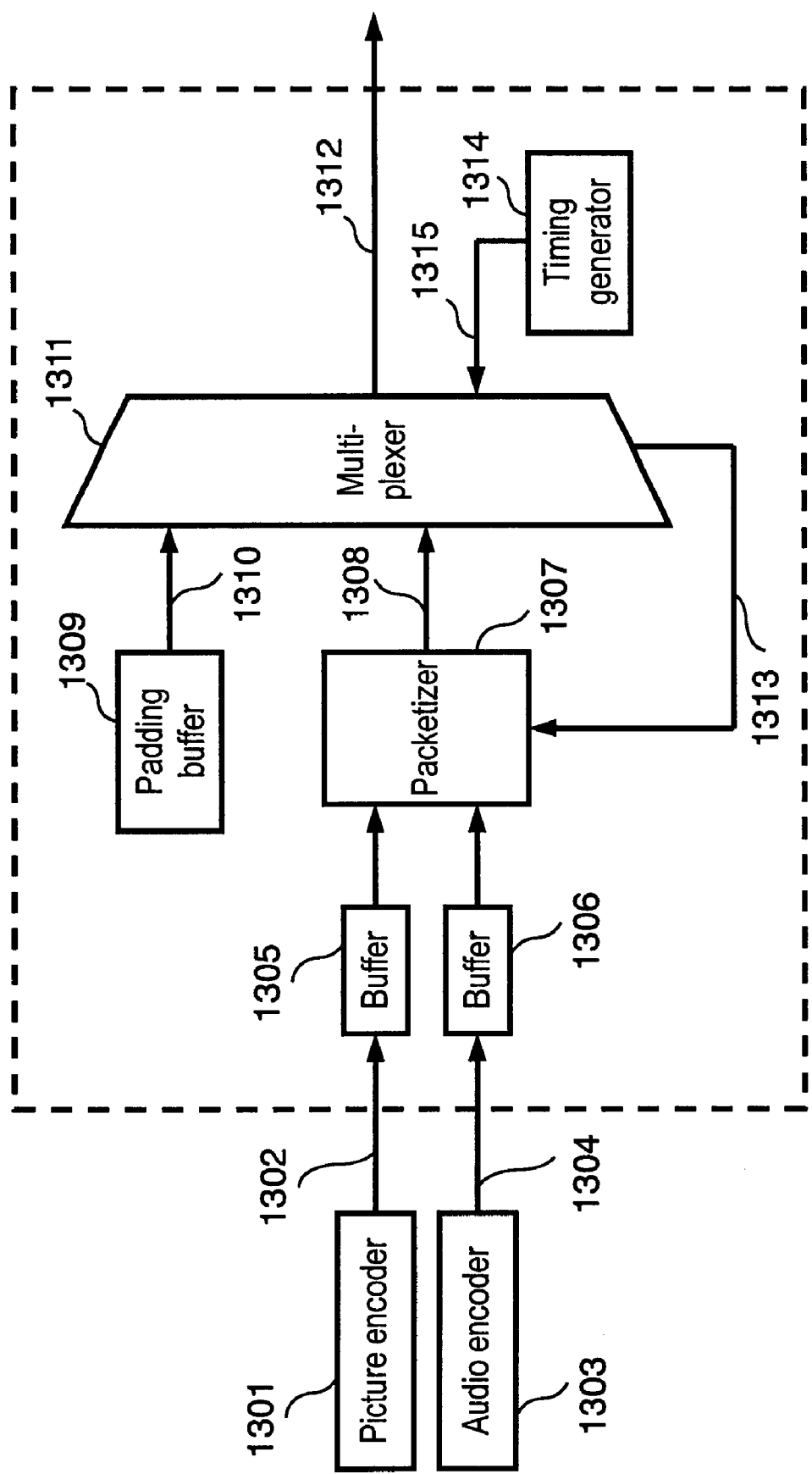
FIG. 13 is a block diagram depicting a conventional multiplexing system 1311 used in MPEG 2 format.
Figure 14:
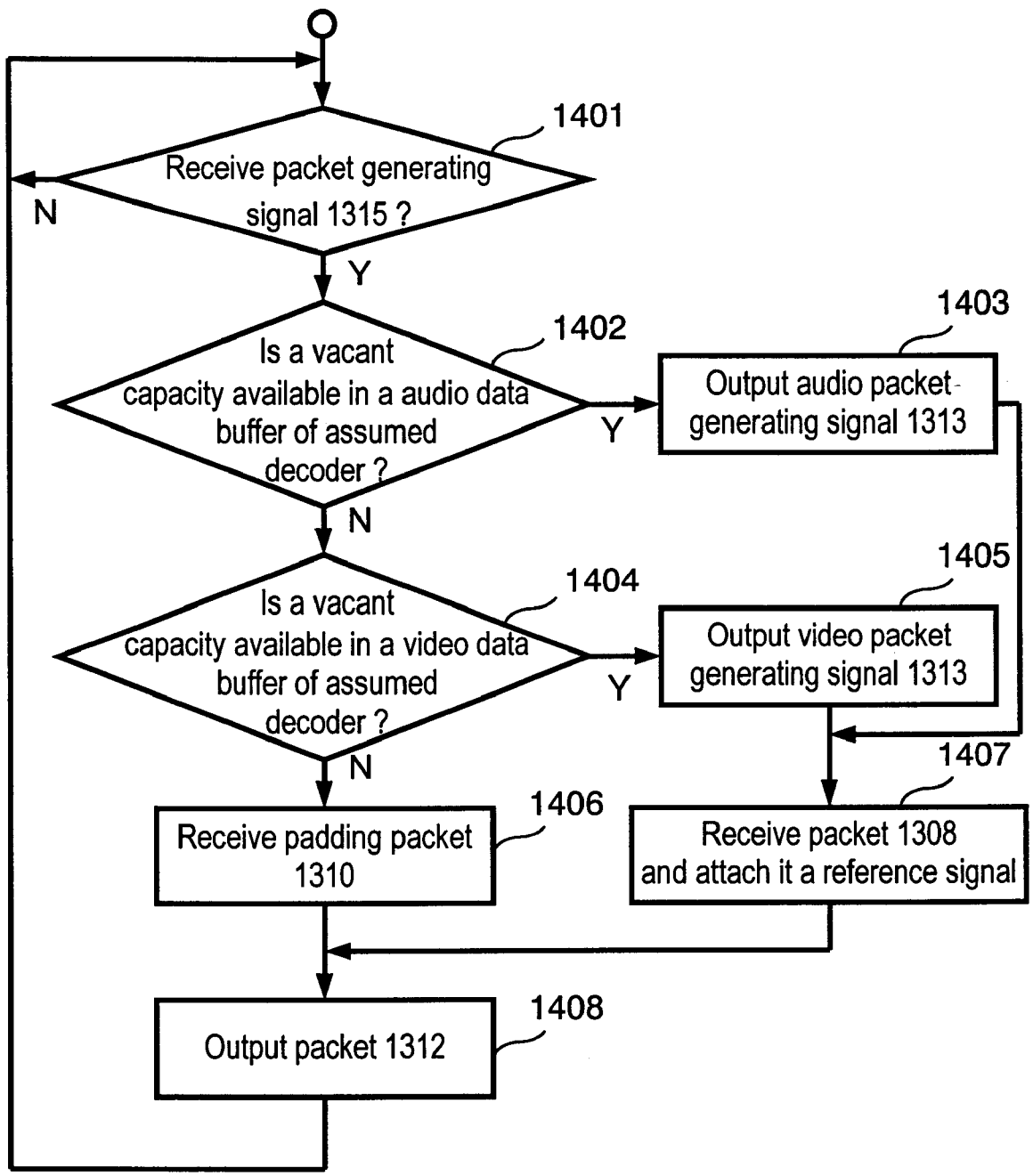
FIG. 14 is a flowchart depicting an operation of a conventional multiplexer 1311.
Figure 15:
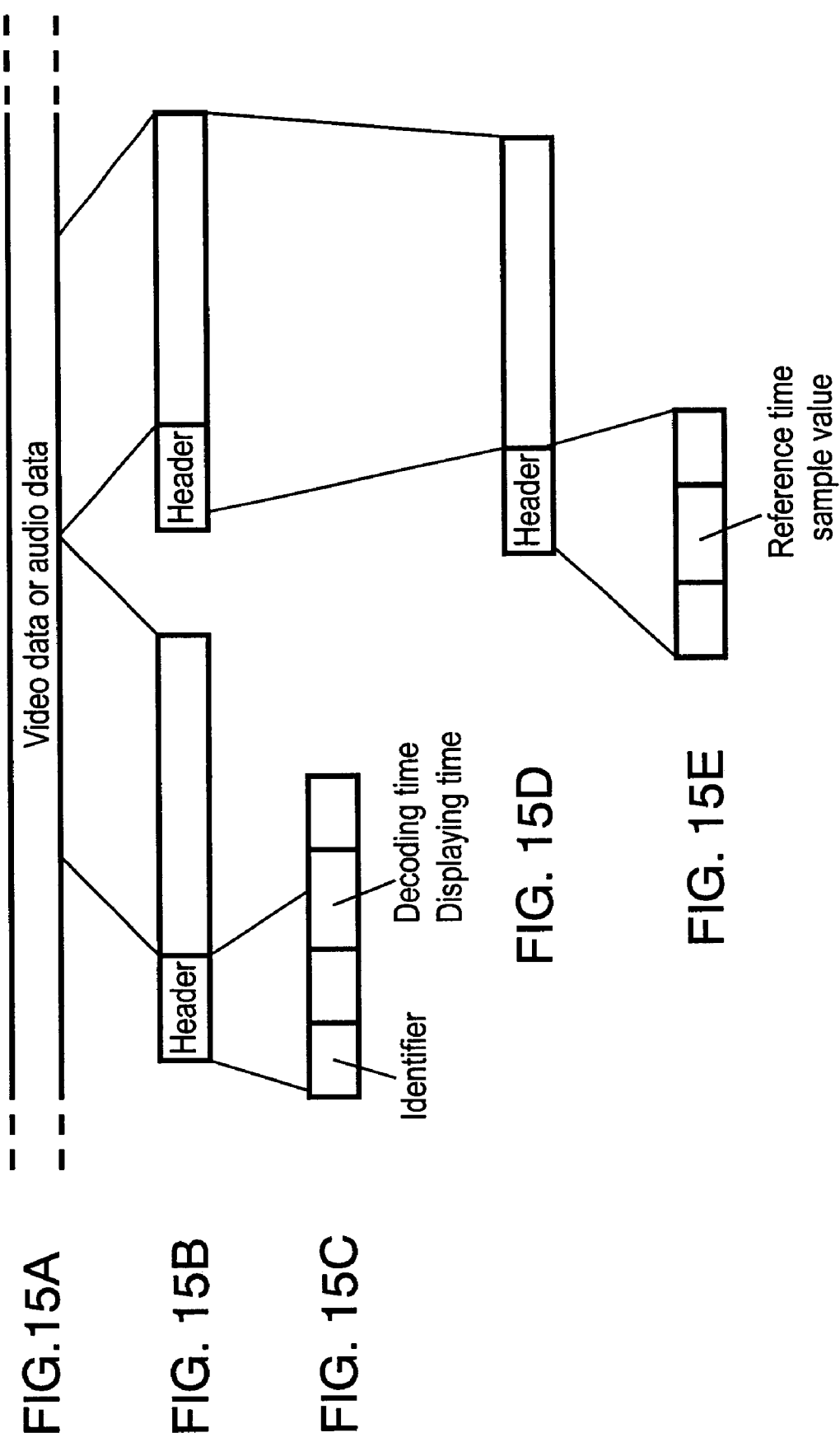
FIG. 15 illustrates a conventional method of data multiplexing in MPEG 2 format.
Figure 16:
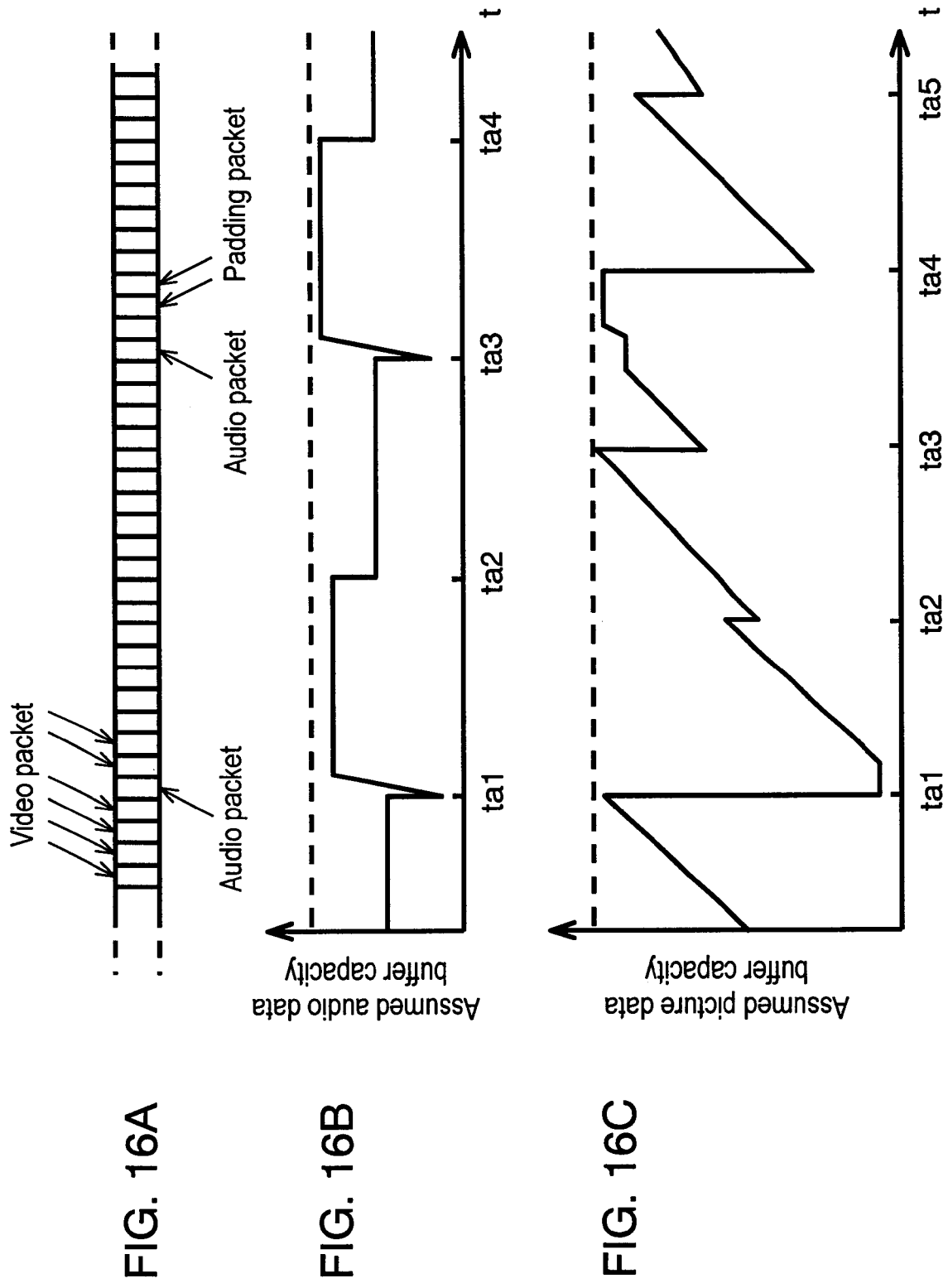
FIG. 16 illustrates a conventional method of data multiplexing in MPEG 2 format.
Figure 17:
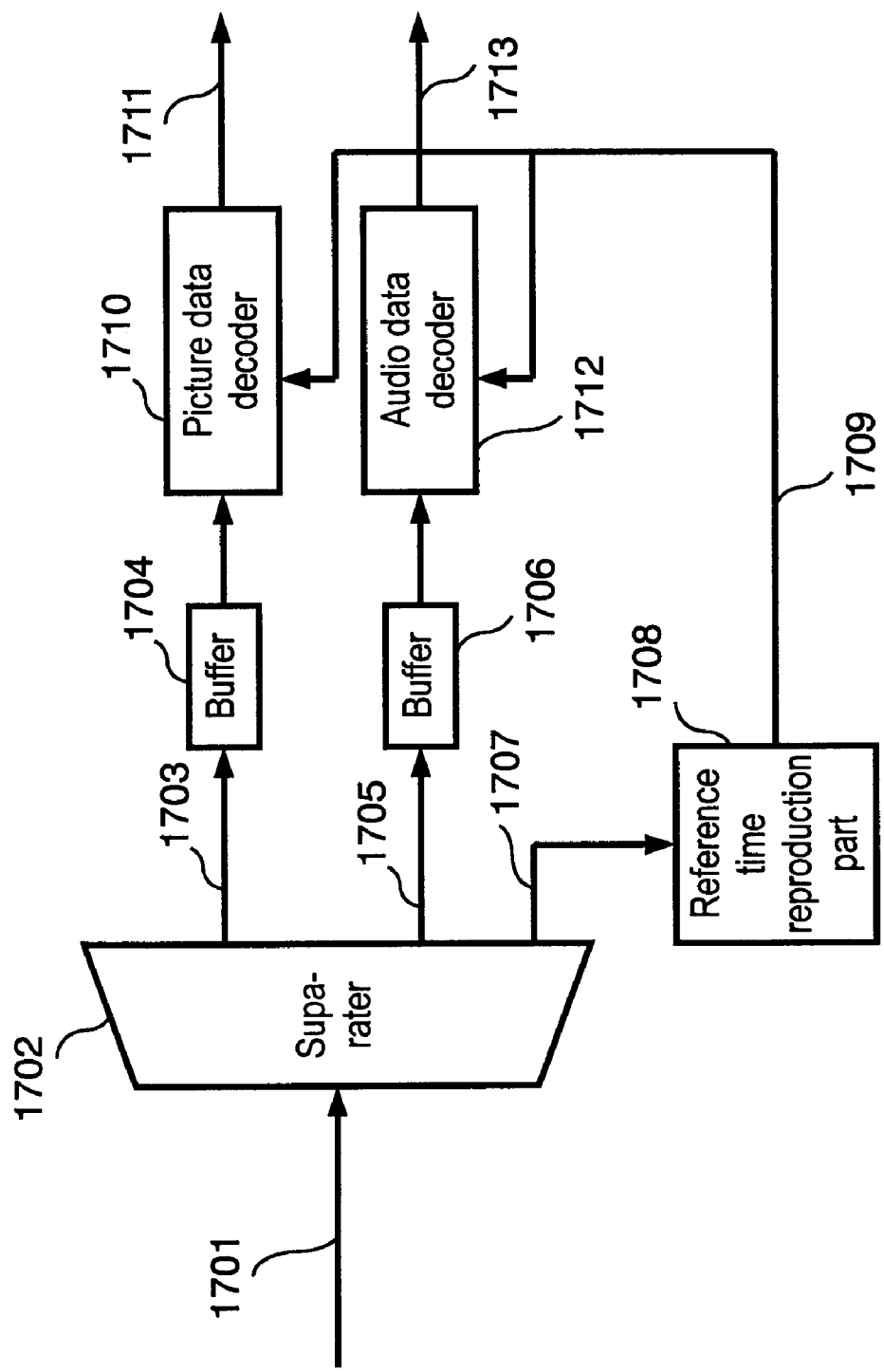
FIG. 17 is a block diagram depicting an operation of the conventional multiplexed data decoder in MPEG 2 format.

A multiplexed data decoder used in the fifth exemplary embodiment of the present invention is described hereinafter with reference to FIG. 11, and a multiplexed-data-decoding-method is described with reference to FIG. 12. FIG. 11 is a block diagram of the decoder that comprises the following elements: separator 1101, table buffer 1105, CPU 1106, decoding buffer 1108, object decoder 1109 and composer 1110. FIG. 12 is a flowchart depicting an operation of the CPU 1106.

A multiplexed data 1102 is supplied with a recording media or transmitted through a transmission line 1104. The multiplexed data supplied to the separator 1101 is divided into a table packet and other packets. The table packet is stored in the first table buffer 1105, where the packet includes the content described in the third exemplary embodiment.

The CPU 1106 operates following the flowchart shown in FIG. 12 as follows.

Step 1201: Receive a buffer capacity of the decoding buffer 1108 shown in FIG. 11 and the buffer capacity is referred to as B(D).

Step 1202: Receive a table packet from the first table buffer 1105 and analyze it thereby obtaining decoding buffer capacity of N pieces of object data to be multiplexed to the multiplexed data (N: natural number) for decoding thereof and the obtained buffer capacities are referred to as B(1)–B(N).

Step 1203: Find a total of B(1)–B(N) and compare it with B(D). When the total is not more than B(D), select all N pieces objects.

Step 1204: When the total is more than B(D), select objects following the priority order recorded in each header of the respective objects so that a total decoding buffer capacity of the selected objects are not more than B(D).

Step 1206: Output a signal 1107 indicating an ID of the selected packet to the separator 1101.

Step 1207: Assign a decoding buffer to the selected objects responsive to their respective necessary buffer capacities, and divide the decoding buffer into sub decoding buffers for each selected object. The separator 1101 outputs only the packets that have IDs specified by the selecting-packet-ID-signal 1107 to the sub decoding buffer, relevant to the selected packet, in the buffer 1108, and abandons the other packets having IDs not specified. The object decoder 1109 decodes each object. The composer 1110 composes respective decoded objects, and outputs the composed reproduced data 1111.

As such, according to the fifth exemplary embodiment of the present invention, the multiplexed-data-decoder that receives multiplexed data of a plurality of object data and decodes thereof, selects the objects to be decoded thereby to decode and reproduce the selected objects exactly in the following manner. When a plurality of object data are multiplexed on the input multiplexed data, objects to be decoded are selected responsive to the decoding buffer capacity, which is then divided into a plurality of sub decoding buffers responsive to the necessary buffer capacities of the respective selected objects.

In this exemplary embodiment, the CPU selects objects to be coded; however, the CPU can inform the data multiplexer described in the first or second exemplary embodiment or the multiplexed data repeater in the fourth exemplary embodiment of the decoding buffer capacity of the decoder via a MODEM. Then, the data multiplexer or the repeater pre-selects the object to be tapped off, then multiplexes or repeats them. This method can save the process of selecting objects described in this fifth exemplary embodiment, and produce a more effective result.

Further in this exemplary embodiment, when the CPU selects the objects to be decoded, the selection follows the priority order specified in the table packet; however, the selection is not limited to this method. For instance, the target objects of the selection are switched at every given interval, or an object placed behind is selected first during a given time, then a foreground object is selected, or an audio object is selected with priority over a picture object. These methods are also effective.

(Exemplary Embodiment 6)

A recording medium used in the sixth exemplary embodiment is described hereinafter, the medium records the data multiplexing method and the multiplexed data decoding method. When the data multiplexing method, the data multiplexer using this method, the multiplexed data repeater, the mutliplexed data decoding method and the multiplexed data decoder using this method of the present invention are effected, a user can operate them readily with an independent computer system using a recording medium such as a floppy disc where a program of effecting the methods mentioned above are recorded.

Figure 18A:
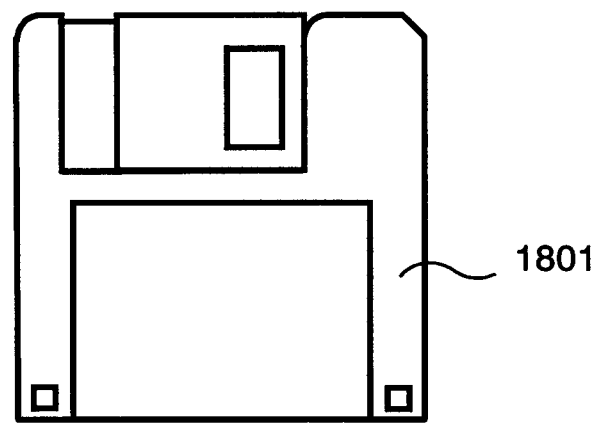
FIG. 18(a) shows an appearance of a floppy disc.
Figure 18B:
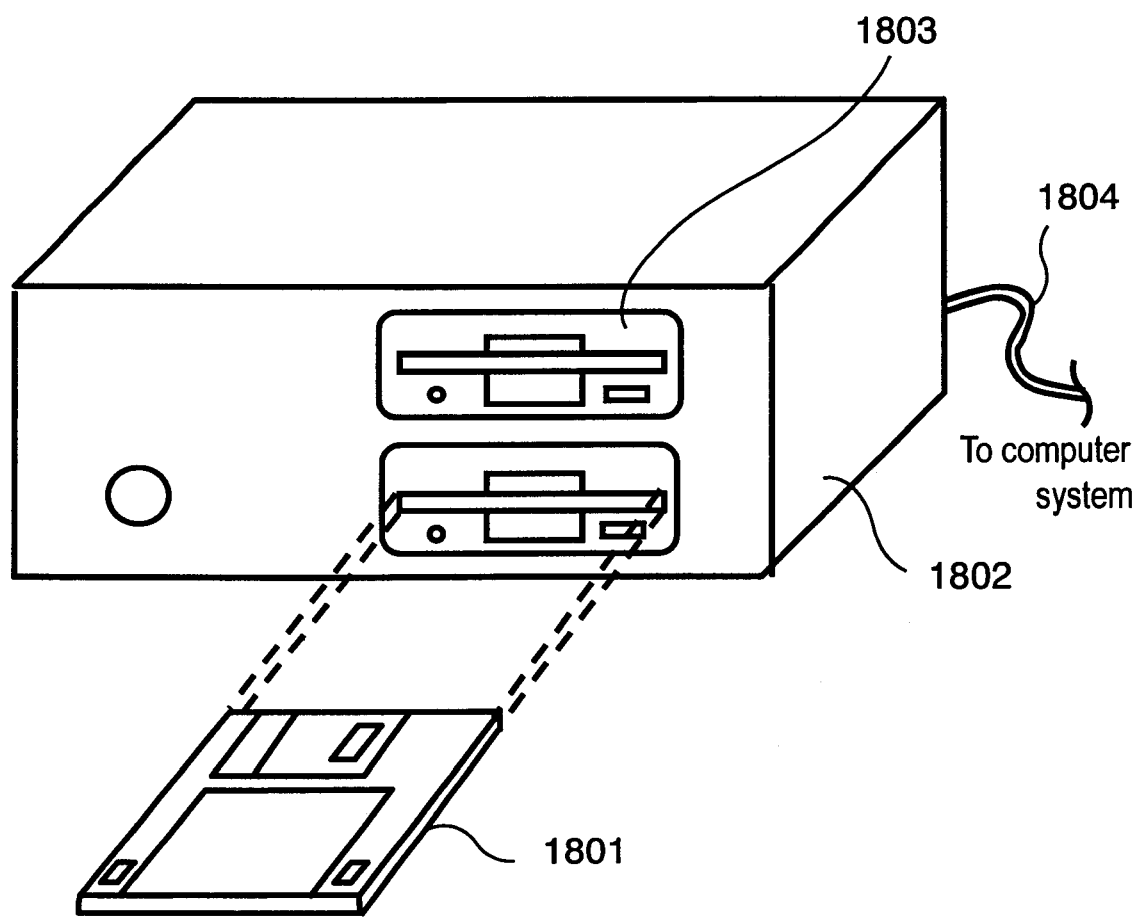
FIG. 18(b) shows an appearance of a floppy disc drive.

When recording the program into a floppy disc, a user writes the program data into a magnetic disc sheet incorporated in the floppy disc 1801 shown in FIG. 18(*a*) using a floppy disc drive system 1802 shown in FIG. 18(*b*). The floppy disc drive system 1802 incorporates a floppy disc drive 1803 (in this case, two drives are incorporated). Input/output signals thereof are sent to the computer system via a signal line 1804. The floppy disc 1801 is inserted into a slit of the drive as shown in FIG. 18(*b*), then is recorded the program data.

When effecting the methods mentioned above or incorporating devices that employ these methods into the computer system with the program recorded in the floppy disc 1801, the user reads out the program from the floppy 1801 disc by means of the floppy disc drive 1803, and sends the data to the computer system via the signal line 1804, thereby effecting the methods.

As such, the data multiplexer and the multiplexed-data-decoder can be constructed with ease by operating the computer system with the recording medium where the data-multiplexing-method and the multiplexed-data-decoding-method are recorded.

In the above description, a floppy disc is used as a recording medium; however, an optical disc also effects the same result. The recording medium is not limited to these media but includes an IC card, ROM cassette, and the like whatever a program can be recorded.

Industrial Applicability

A data multiplexing method of the first invention can effect the following advantage when a plurality of object data are multiplexed and transmitted. When coded data is transmitted between systems of which decoders have different decoding-buffer-capacities, decoding-buffer-capacities of the receiver sides should be informed to the transmitter beforehand. Then a given capacity set in the transmitter side can be controlled responsive to the capacity of the receiver. The object data thus can be decoded exactly and free from missing an important object.

A data multiplexing method of the second invention can effect the following advantage when a plurality of object data are multiplexed and transmitted. The objects are multiplexed so that the coding rates of each object data are not more than the transmission rate of the transmission line. Therefore, the multiplexed data can be exactly transmitted.

A data multiplexing method of the third invention can effect the following advantage when decoding-buffer-capacity necessary for decoding the multiplexed objects, coding rates and priority order necessary for transmission are packetized into a table packet, and then the table packet is multiplexed. The multiplexed objects can be changed with ease and the objects can be selected readily before they are decoded. If the decoding buffer capacity is insufficient at the decoder side when the received multiplexed data are decoded, the priority order specified at the transmitter side is obtained and the data units are selected following the priority order before the data are decoded. As a result, important data can be decoded free from being missed.

A multiplexed data decoding method of the fourth invention effects the following advantage. Digital data including pictures, audio, characters or other data are multiplexed in a unit of object. The decoder receives this multiplexed data and prepares several steps before decoding. First, obtain a total decoding buffer capacity necessary for decoding this digital data, second, check a buffer decoding capacity captured in this decoder per se. When the total capacity exceeds the captured capacity, the digital data are selected so that the data desirable to be transmitted can be decoded and reproduced even if the receiver has the insufficient decoding buffer capacity. Regarding the transmission rate, the same procedure as mentioned above is employed with the same effect.

A multiplexed data repeater of the fifth invention effects the following advantage. When the transmission rate is different at the input side and the output side of the repeater, the objects to be multiplexed are appropriately selected responsive to the transmission rate at the output side. As a result, the multiplexed data are exactly transmitted.

A multiplexed data decoder of the sixth invention effects the following advantage. An appropriate sub-decoding buffer capacity within the decoding buffer capacity captured in the decoder is assigned to each object to be decoded so that the selected objects can be exactly decoded and reproduced.

A recording medium of the seventh invention is used in a computer system to effect with ease the data multiplexer, multiplexed data repeater, and multiplexed data decoder of the present invention.

LIST OF REFERENCE SYMBOLS

101 recorder
102 header including coding information of a first object
103 first object data
104 header including coding information of a second object
105 second object data
106 header including coding information of a third object
107 third object data
108 first switch
109 second switch
110 third switch
115 decoding buffer capacity of a decoder
116 switch controlling signal
118 packet produced by a packetizer 117
119 object selecting signal
121 padding packet
123 output multiplexed data
125 packet producing signal
701 object data
702 packetized object data
703 switch
704 padding packet
705 multiplexed packet stream
902 input multiplexed data
906 output transmission rate
907 ID signal of a selected packet
1102 input multiplexed data
1103 recording medium
1104 transmission line
1107 ID signal of a selected packet
1109 object decoder
1110 composer
1111 reproduced data
1302 picture data
1304 audio data
1308 packet supplied from a packetizer 1307
1310 padding packet
1312 output multiplexed data
1313 packet producing signal
1315 packet producing signal
1801 floppy disc
1802 floppy disc drive system

What is claimed is:
1. A data multiplexing method comprising the steps of:
   (a) receiving and multiplexing N pieces of digital data including at least one of pictures, audio, characters and another form of data (N=natural number);
   (b) preparing a buffer capacity necessary for decoding the N pieces of digital data;
   (c) comparing the prepared buffer capacity with a predetermined capacity based on information from a decoder that decodes each the N pieces of digital data;
   (d) selecting M pieces of digital data out of the N pieces of digital data so that a decoded buffer capacity necessary for decoding the M pieces of digital data can be not more than the predetermined capacity (M=natural number, and $1 \leq M \leq N$);
   (e) multiplexing the M pieces of digital data; and
   (f) outputting the multiplexed digital data as a single multiplexed data.

2. The data multiplexing method as defined in claim 1, wherein the predetermined capacity is a data capacity of decoding buffer memory of the decoder that receives and decodes the multiplexed data.

3. A data multiplexing method comprising the steps of:
   (a) preparing coded digital data of each predetermined object of at least one of a picture, audio, a character;
   (b) calculating a first decoding buffer capacity necessary for decoding all the decoded digital data of the N pieces object (N=natural number);
   (c) setting a second decoding buffer capacity being prepared at the decoding based on information from a decoder that decodes each of the N pieces of digital data;
   (d) comparing the first and the second decoding buffer capacities;
   (e) when the first capacity exceeds the second one, selecting M pieces of objects out of the N pieces of objects based on a priority order and outputting the selected M pieces of objects (M:natural number, $1 \leq M \leq N$); and
   (f) multiplexing coded digital data of the selected objects.

4. A data multiplexing method comprising the steps of.
   (a) receiving and multiplexing N pieces of digital data including at least one of pictures, audio, characters and another form of data (N=natural number);

(b) receiving N pieces of transmission rates necessary before outputting each of the respective N pieces digital data;

(c) comparing the received transmission rates with a rate predetermined based on a bandwidth of a transmission line;

(d) selecting M pieces of digital data out of N pieces so that the total transmission rates of respective M pieces digital data can be not more than the predetermined transmission rate (M=natural number, and $1 \leq M \leq N$);

(f) multiplexing the selected M pieces digital data; and (g) outputting the multiplexed digital data as a single multiplexed data.

5. The data multiplexing method as defined in claim 4, wherein the predetermined rate is a value corresponding to a transmission data capacity of the transmission line.

6. The data multiplexing method as defined in claim 1, wherein the M pieces of digital data are selected out of the N pieces of digital data following a priority order assigned to each digital data (M, N=natural numbers, and $1 \leq M \leq N$).

7. The data multiplexing method as defined in claim 1, wherein the M pieces of digital data are selected out of the N pieces of digital data at every predetermined time interval (M, N=natural numbers, and $1 \leq M \leq N$).

8. The data multiplexing method as defined in claim 1, wherein the M pieces of digital data are selected out of the N pieces of digital data by giving priority to an audio data over a picture data (M, N=natural numbers, and $1 \leq M \leq N$).

9. The data multiplexing method as defined in claim 1, the M pieces of digital data are selected out of the N pieces of digital data by selecting digital data that are supposed to be placed backward in a reproduced picture during a predetermined period, then selecting another digital data that are supposed to be placed forward in the reproduced picture (M, N=natural numbers, and $1 \leq M \leq N$).

10. The data multiplexing method as defined in. claim 6, wherein the M pieces of digital data are selected out of the N pieces of digital data by giving priority to an audio data over a picture data (M, N=natural numbers, and $1 \leq M \leq N$).

11. The data multiplexing method as defined in claim 6, wherein the M pieces of digital data are selected out of the N pieces of digital data by selecting digital data that are supposed to be placed backward in a reproduced picture during a predetermined period, then selecting another digital data that are supposed to be placed forward in the reproduced picture (M, N=natural numbers, and $1 \leq M \leq N$).

12. A data multiplexing method comprising the steps of:

(a) receiving N pieces of object data including at least one of pictures, audio, characters and another form of data, these data having an identifier that identifies respective data one of the picture, the audio, the character and the other form of data, and multiplexing them (N=natural number);

(b) producing a table data including at least one of the following data:
   (b-1) a number of digital data to be multiplexed;
   (b-2) decoding buffer capacities of each digital data;
   (b-3) coding rates of each digital data;
   (b-4) priority order of each digital data; and
   (b-5) identifiers of each digital data, which identify the data one of a picture, audio, a character and another form of data, and (c) multiplexing the table data to the multiplexed data, and outputting the resultant multiplexed data.

13. A multiplexed data decoding method comprising the steps of:

(a) receiving N pieces (N=natural number) of multiplexed digital data that has been multiplexed with one of the data-multiplexing-methods defined in claim 1, said data including at least one of a picture, audio, a character and another form of data;

(b) separating a first decoding buffer capacity from the received multiplexed data, and obtaining the first decoding buffer capacity;

(c) obtaining respective decoding buffer capacities necessary for decoding N pieces of digital data;

(d) finding a total decoding buffer capacity of the N pieces digital data as a second decoding buffer capacity, and obtaining the second decoding buffer capacity;

(e) checking whether the first decoding buffer capacity exceeds the second one; and (f) when the first capacity exceeds the second one, selecting M pieces of digital data from the multiplexed data and outputting the M pieces of digital data ($1 \leq M \leq N$).

14. A multiplexed data repeater characterized in that:

receiving N (N=natural number) pieces of multiplexed digital data that has been multiplexed with one of the data-multiplexing-methods defined in claim 1, said data including at least one of a picture, audio, a character and another form of data, selecting M pieces of digital data out of said digital data, and outputting the M pieces of digital data (M=natural number and $1 \leq M \leq N$).

15. A multiplexed data repeater comprising:

(a) a separator for receiving multiplexed data of;
   (a-1) N pieces (N=natural number) of digital data including at least one of a picture, audio, a character and another form of data;
   (a-2) table data including at least one of a number of digital data to be multiplexed;
   decoding buffer capacities of each digital data;
   coding rates of each digital data;
   priority order of each digital data; and
   identifiers of each digital data, which identify the data one of a picture, audio, a character and another form of data;

(b) a first buffer for storing a desirable multiplexed data separated by said separator;

(c) a second buffer for storing the table data separated by said separator;

(d) a selector for
   (d-1) obtaining the table data from said second buffer,
   (d-2) selecting M (M=natural number and $1 \leq M \leq N$) pieces of digital data out of the desirable multiplexed data by analyzing the table data,
   (d-3) producing a signal that identifies multiplexed data to be selected, and
   (d-4) producing the table data that has been changed to indicate information about the selection, then outputting the table data to a third buffer, and (e) a multiplexer for multiplexing the multiplexed data that has been stored in said first buffer and the table data that has been stored in the third buffer.

16. A multiplexed data decoder characterized in that:

receiving one of multiplexed digital data that has been multiplexed with one of the data multiplexing methods defined in claim 1, 3, 4, or 12, said data including at least one of a picture, audio, a character and another form of data, and multiplexed data supplied from a multiplexed data repeater defined in claim 14, selecting M pieces of digital data (M=natural number and $1 \leq M \leq N$), then decoding the M pieces of digital data from said data, and reproducing the picture, audio, character and another form of data.

17. A multiplexed data decoder comprising:
(a) a separator for receiving multiplexed data of;
   (a-1) N pieces (N=natural number) of digital data including at least one of a picture, audio, a character and another form of data;
   (a-2) table data including at least one of a number of digital data to be multiplexed;
   decoding buffer capacities of each digital data;
   coding rates of each digital data;
   priority order of each digital data; and
   identifiers of each digital data, which identify the data one of a picture, audio, characters and another form of data.
(b) a decoding buffer for storing a desirable multiplexed data separated by said separator;
(c) a table buffer for storing the table data separated by said separator;
(d) a selector for
   (d-1) obtaining the table data from said table buffer,
   (d-2) selecting M (M=natural number and $1 \leq M \leq N$) pieces of digital data out of the desirable multiplexed data by analyzing the table data,
   (d-3) producing a signal that identifies multiplexed data to be selected,
   (d-4) producing the table data, then outputting it to a third buffer, and
   (d-5) dividing said decoding buffer into M pieces of sub decoding buffers,
(e) a decoder for receiving the M pieces of digital data, then outputting resultant decoded data, and
(f) a composer for composing the coded data, then outputting a produced picture.

18. The multiplexed data decoder as defined in claim 16 further comprising a transmitter for transmitting information of a decoding buffer capacity that is supposed to store the multiplexed data to a multiplexing system outputting the multiplexed data.

19. The multiplexed data decoder as defined in claim 17 further comprising a transmitter for transmitting information of a decoding buffer capacity that is supposed to store the multiplexed data to a multiplexing system outputting the multiplexed data.

20. A recording medium in which at least one of the data-multiplexing-methods and the multiplexed-data-decoding-methods defined in claims 1, are recorded.

* * * * *

UNITED STATES PATENT AND TRADEMARK OFFICE
CERTIFICATE OF CORRECTION

PATENT NO.    : 6,418,140 B1
DATED         : July 9, 2002
INVENTOR(S)   : Yoshinori Matsui It is certified that error appears in the above-identified patent and that said Letters Patent is hereby corrected as shown below:

Column 14,
Line 64, change "of." to -- of: --; and

Column 17,
Line 18, change "data." to -- data; --.

Signed and Sealed this

Eighth Day of April, 2003

JAMES E. ROGAN
*Director of the United States Patent and Trademark Office*